(12) United States Patent
Graham et al.

(10) Patent No.: US 11,503,146 B1
(45) Date of Patent: Nov. 15, 2022

(54) SYSTEM AND METHOD FOR CALLING A SERVICE REPRESENTATIVE USING AN INTELLIGENT VOICE ASSISTANT

(71) Applicant: UIPCO, LLC, San Antonio, TX (US)

(72) Inventors: Richard Daniel Graham, Plano, TX (US); Ruthie D. Lyle, Durham, NC (US)

(73) Assignee: United Services Automobile Association (USAA), San Antonio, TX (US)

(*) Notice: Subject to any disclaimer, the term of this patent is extended or adjusted under 35 U.S.C. 154(b) by 73 days.

(21) Appl. No.: 17/147,865

(22) Filed: Jan. 13, 2021

Related U.S. Application Data

(63) Continuation of application No. 16/816,726, filed on Mar. 12, 2020, now Pat. No. 10,924,599, which is a continuation of application No. 16/404,806, filed on May 7, 2019, now Pat. No. 10,659,585.

(60) Provisional application No. 62/738,592, filed on Sep. 28, 2018.

(51) Int. Cl.
*H04M 1/27* (2006.01)
*G10L 15/22* (2006.01)

(52) U.S. Cl.
CPC .............. *H04M 1/271* (2013.01); *G10L 15/22* (2013.01); *G10L 2015/223* (2013.01)

(58) Field of Classification Search
CPC ... H04M 1/271; G10L 15/22; G10L 2015/223
See application file for complete search history.

(56) References Cited

U.S. PATENT DOCUMENTS

| | | | |
|---|---|---|---|
| 10,659,585 B1 * | 5/2020 | Graham | .............. G10L 15/22 |
| 10,924,599 B1 * | 2/2021 | Graham | .............. H04M 3/493 |
| 2011/0301951 A1 | 12/2011 | Basir | |
| 2015/0381796 A1 | 12/2015 | Cox et al. | |
| 2016/0262017 A1 | 9/2016 | Lavee et al. | |
| 2017/0255962 A1 | 9/2017 | Lim et al. | |
| 2020/0273461 A1 | 8/2020 | Kothari | |

* cited by examiner

*Primary Examiner* — Diane D Mizrahi
(74) *Attorney, Agent, or Firm* — Plumsea Law Group, LLC

(57) ABSTRACT

A system and method for making a call to a service provider on behalf of a user is disclosed. The system and method include using an intelligent voice assistant to call the service provider and having the intelligent voice assistant navigate an interactive voice response system to reach a representative. The system and method also include using the intelligent voice assistant to reconnect a user with a representative after an interrupted call.

20 Claims, 30 Drawing Sheets

SYSTEM AND METHOD FOR CALLING A SERVICE REPRESENTATIVE USING AN INTELLIGENT VOICE ASSISTANT

CROSS-REFERENCE TO RELATED APPLICATIONS

This application is a continuation of and claims priority to U.S. application Ser. No. 16/816,726, filed Mar. 12, 2020, titled "System and Method for Calling a Service Representative Using an Intelligent Voice Assistant", which application issued as U.S. Pat. No. 10,924,599 and which application is a continuation of and claims priority to U.S. application Ser. No. 16/404,806, filed May 7, 2019, titled "System and Method for Calling a Service Representative Using an Intelligent Voice Assistant", which application issued as U.S. Pat. No. 10,659,585 and which application claims the benefit of U.S. Provisional Patent Application No. 62/738,592, filed Sep. 28, 2018, titled "System and Method for Calling a Service Representative Using an Intelligent Voice Assistant", the disclosure of which applications are hereby incorporated by reference herein in their entirety.

TECHNICAL FIELD

The present disclosure generally relates to using an intelligent voice assistant to improve a user's experience with a service provider, and in particular, to using the intelligent voice assistant to assist users in understanding documents and interacting with a service representative.

BACKGROUND

Service providers like banks and insurance companies are often required to send various kinds of documents to a user, including financial disclosure forms, account summaries, insurance claim forms and other types of documents. The organization's users (for example, members or customers) may find the process of reviewing documents confusing, tedious, and/or frustrating. Most users would generally prefer a simple summary of the document's most important content rather than having to wade through pages upon pages of legal jargon or long lists of financial transactions. Users often simply want to know if the document requires immediate action. Specifically, users often want to know if the document is a bill or a form that must be signed. Often, to make sense of a document, a user must contact a representative of the service provider (such as a customer relations representative, or customer services representative).

Users needing to contact a service representative of the service provider, whether to discuss a document they received or another issue, are often subjected to an automated menu, or phone tree, such as an interactive voice response (IVR) menu common in the customer service industry. Rather than being able to reach a representative immediately, a user must take time to answer predetermined questions that act to direct the user to the correct department, a specific representative, or, a recording of information.

Even when a representative has been reached, a user may become frustrated with the interaction as the kind of information that can be conveyed over the phone is limited. As an example, if a representative is describing a part of a document that a user recently received, the conversation may be frustrating to both parties since the representative has to explain verbally where to look on the form, rather than being able to "show" the user where to look, as they could do if the two were meeting in person.

Additionally, conversations between user's and representatives can be difficult because the representative often lacks context for the user's state of mind, the user's environment, and even the user's technological capabilities.

There is a need in the art for a system and method that addresses the shortcomings discussed above.

SUMMARY

In one aspect, a method of making a call for a user, where the method is performed by an intelligent voice assistant, includes steps of receiving an audible request from the user to place a call to a service provider, initiating a phone call, receiving audible questions from an interactive voice response system, responding audibly to the questions until a representative of the service provider is reached and prompting the user to speak with the representative on the call.

In another aspect, a method of connecting a user and a representative of a service provider, where the method is performed by an intelligent voice assistant, includes steps of receiving an audible request from the user to call the company and sending information to at least one computer system of the service provider. The information includes a request to connect directly with the representative. The method also includes steps of receiving a response from the at least one computer system and initiating a call between the user and the representative based on the response.

In another aspect, a method of reconnecting a user with a first representative of a service provider after an interrupted phone call, where the method is performed by an intelligent voice assistant, includes steps of retrieving representative identification information for the interrupted phone call, where the representative identification information corresponds to the first representative. The method also includes initiating a phone call to the service provider, speaking with a second representative and asking to be re-connected with the first representative and prompting the user to speak with the first representative on the call.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a system and method for using an intelligent voice assistant to help customers, members and other users of a service (for example, a financial service or an insurance service) to accomplish various tasks in a manner that improves user satisfaction. In one embodiment, an intelligent voice assistant can provide audible summaries of documents to a user. By providing customized summaries of documents that can be read out loud to a user, the system and method reduce the time a user needs to spend reading documents such as financial disclosure documents, insurance claim forms and bills, which can improve user satisfaction with the service. In another embodiment, an intelligent voice assistant can be used to automatically navigate a user's device to a target section of an electronic document. By automatically controlling a user's view of the electronic document, the system and method may improve the experience of signing documents, paying bills or reviewing important information that may be buried in a multi-page document. In another embodiment, an intelligent voice assistant can be used to automatically call a service representative for a service provider. Specifically, the intelligent voice assistant can automatically navigate an interactive voice response system or initiate a direct connection with a service representative in order to bypass conventional phone trees. By automatically connecting a user with a representative and bypassing a phone tree, the system and method improve the user experience of calling a service provider to ask questions, alter services or obtain information. In another embodiment, an intelligent voice assistant can provide enhanced assistance during a call between a user and a service representative. Specifically, the intelligent voice assistant can identify noises in a user's environment and assess user stress levels to provide additional context to the service representative. The intelligent voice assistant can also analyze a user's words or vocal patterns for different sentiments to provide additional context to the service representative. The intelligent voice assistant can also provide suggestions to a user for accomplishing tasks related to electronic documents. By providing enhanced assistance during a call between a user and service representative, the system and method can help provide the service representative with more context during a call, so the service representative can better anticipate the user's needs and improve the user's satisfaction with the call.

The embodiments make use of methods and systems in artificial intelligence. As used herein, "artificial intelligence" may include any known methods in machine learning and related fields. As examples, artificial intelligence may include systems and methods used in natural language processing (NLP).

Figure 1:
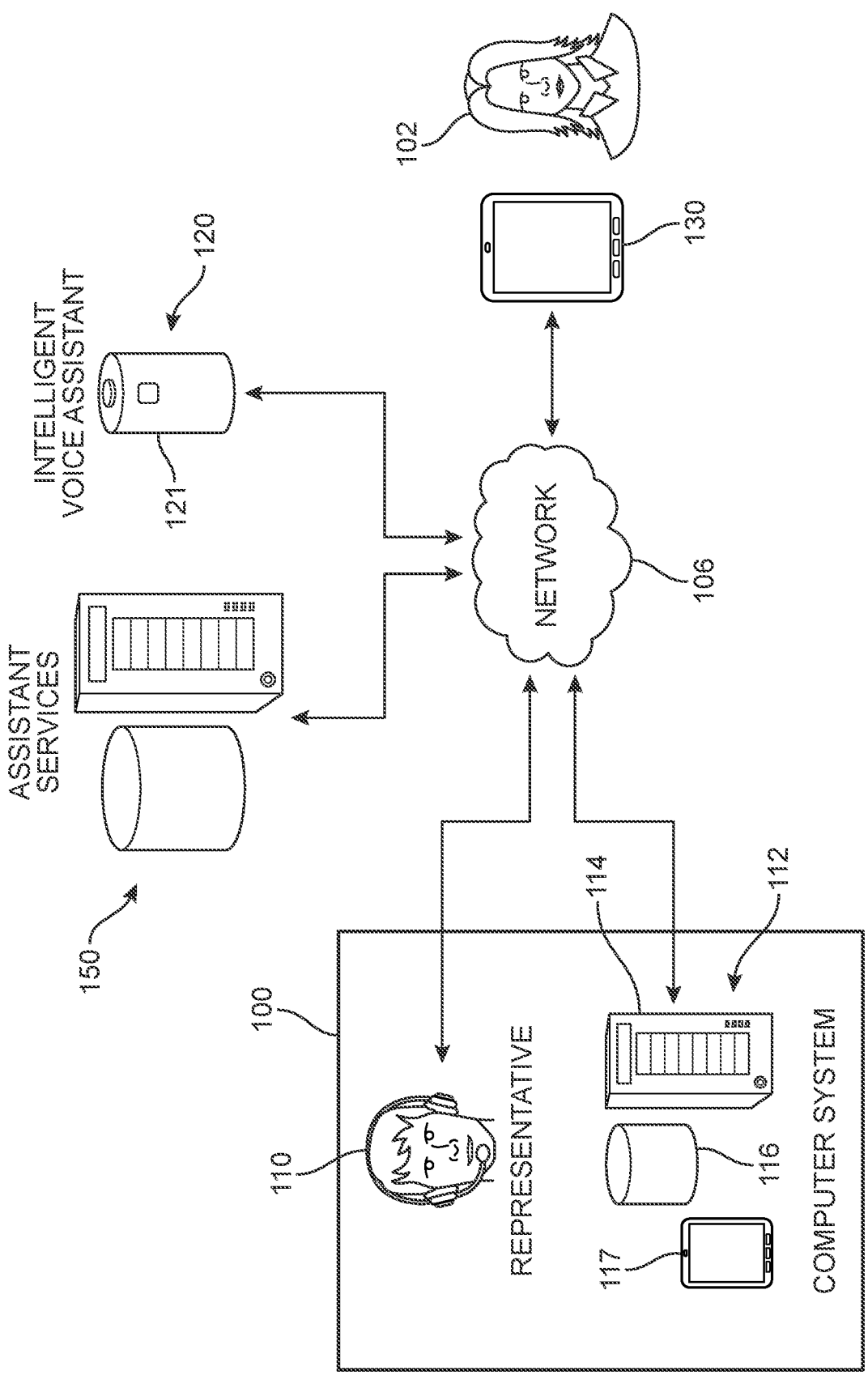
FIG. 1 is a schematic view of systems for facilitating communication between a user and a service representative, according to an embodiment.

FIG. 1 is a schematic view of some of the systems, components and devices that may be used to facilitate interactions between a service provider 100 and a user 102 of the customer service system. Service provider 100 may be a company or any other organization that provides services to users. In one embodiment, service provider 100 could be a bank. In another embodiment, service provider 100 could be an insurance company. In another embodiment, service provider 100 could be a company that provides banking services and insurance services as well as other kinds of services. User 102 could be a customer, or member, or could any other user of services provided by service provider 100.

To facilitate interactions with customers, members or general users of its services, service provider 100 may include at least one service representative 110. As used herein, the term "service representative" (or simply, "representative") refers to any individual operating in a capacity to represent a service provider in interactions with a customer or user. The representative could be, for example, an employee at a call center.

A representative could operate within a larger customer service system (or department) of service provider 100. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

Service provider 100 is also comprised of at least one computer system 112. The term "computer system" refers to the computing resources of a single computer, the partial computing resources of a single computer, a plurality of computers communicating with one another, or a network of remote servers. In an exemplary embodiment, computer system 112 includes at least one server.

In the embodiment of FIG. 1, computer system 112 comprises one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory.

In some embodiments, representative 110 may have access to a device of computer system 112. In the exemplary embodiment of FIG. 1, representative 110 may have access to representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review user records, send documents and forms to a user and/or perform other tasks required to help the user.

User 102 may have access to a user device 130. In the exemplary embodiment of FIG. 1, user device 130 comprises a mobile device. For example, user device 130 could be a smartphone or a tablet computer. In other embodiments, however, a user device could comprise a tablet, a laptop, a desktop computer, or similar kind of device.

Both representative device 117 and user device 130 may comprise computer systems for processing and communicating information. Each device may generally include a processor, a data storage component and a display. Each device may also include components to facilitate communication with external systems (for example, hardware and software components to enable communication over a network). In some cases, a device includes one or more input devices. These could include a keyboard, mouse, or one or more physical buttons integrated into a case of the device. In some cases, a device includes touchscreen controls.

User device 130 could operate in a client-server relationship with one or more servers of computer system 112. For example, computer system 112 may include a server that communicates with user device 130 as well as other remote devices over network 106. User device 130 may provide the front-end of a system that provides users with options for performing various kinds of tasks (for example, making fund transfers when the company is a bank). In some cases, user device 130 may run client software through a web browser, in which case the client software may be hosted on a server associated with computer system 112. In other cases, user device 130 may run client software in the form of a native software application that has been downloaded through a centralized marketplace (i.e., an "app store"). In some cases, while the client software that allows users to perform various tasks may be run on user device 130, the data may be retrieved from and stored on databases associated with computer system 112.

Figure 2:
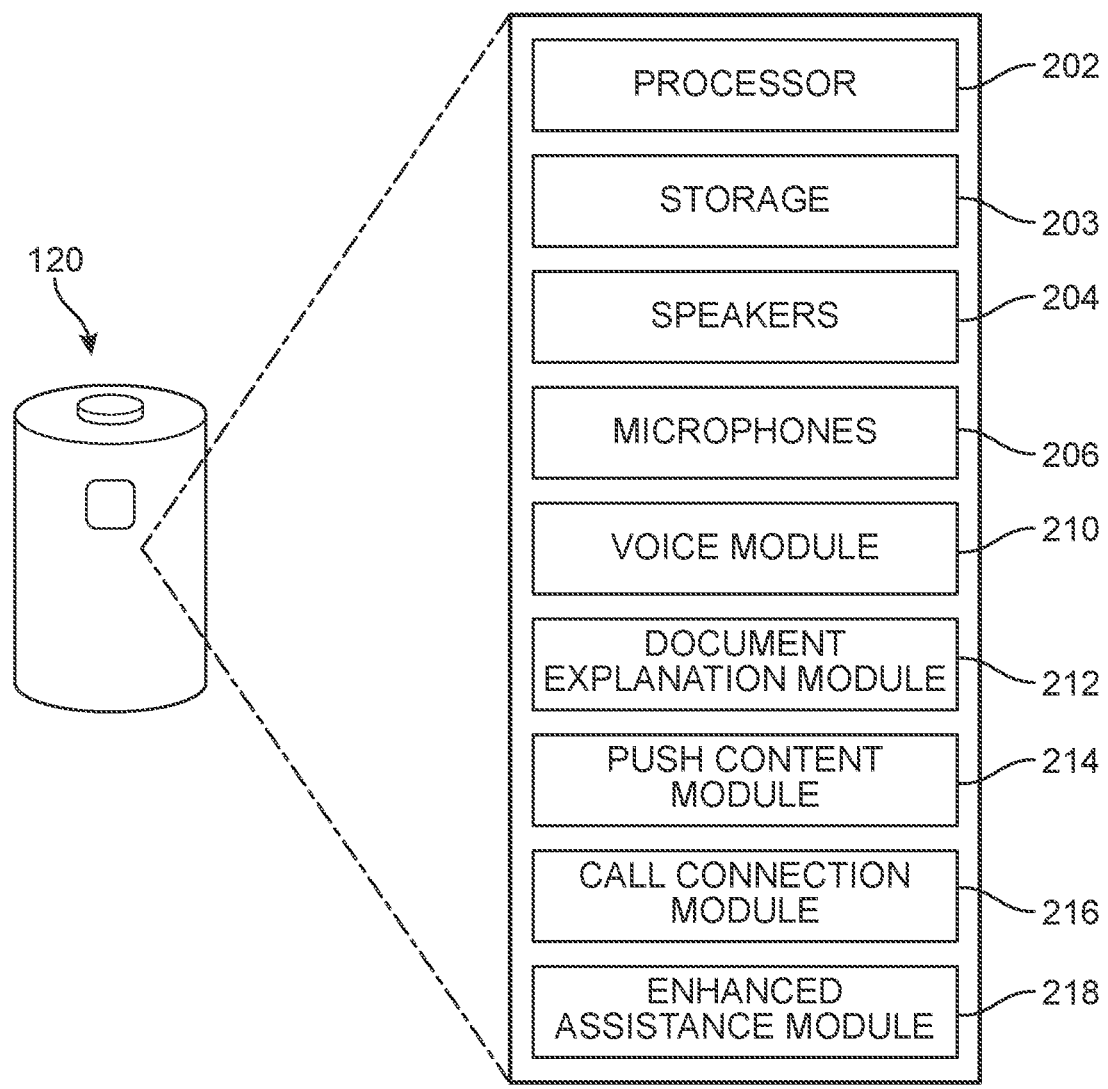
FIG. 2 is a schematic view of an intelligent voice assistant, including some hardware and software components, according to an embodiment.

User 110 may have access to an intelligent voice assistant 120. As used herein, the term "intelligent voice assistant" refers to an artificially intelligent assistant, also called a virtual assistant, that can speak to a user and understand a user's spoken words. Voice assistants, along with chat bots, may be more generally referred to as conversational interfaces (or CUIs), whose purposes are to mimic conversations with a real human. Referring to FIG. 2, intelligent voice assistant 120 may be configured with at least one processor 202, storage 203 (computer memory), one or more speakers 204 and one or more microphones 206. Speakers 204 may be used to produce audible information (that is, words and other sounds). Microphones 206 may receive audible information (that is, words and other sounds). Optionally, an intelligent voice assistant 120 could include a display. Intelligent voice assistant 120 may also include components to facilitate communication with external systems (for example, hardware and software components to enable communication over network 106). Optionally, an intelligent voice assistant 120 could include other input devices such as buttons, a keyboard, a touch screen or other suitable input devices.

To ensure that intelligent voice assistant 120 is able to detect commands or other speech from users throughout an environment (such as a room in a house), microphones 206 could comprise one or more far-field microphones. In some cases, the far-field microphones could also be directional.

Using far-field microphones may allow intelligent voice assistant 120 to detect audible information that would not be detectable by other devices such as cell phones.

Intelligent voice assistant 120 may include one or more software and/or hardware modules that facilitate various kinds of interactions with a user, including some of the interactions described above. For example, intelligent voice assistant 120 may include a voice module 210 that controls general speech functionality, such as voice recognition and speech generation. Additionally, intelligent voice assistant 120 may include document explanation module 212, push content module 214, call connection module 216 and enhanced assistant module 218. Each of these modules may help enable the functionality described in further detail below.

An intelligent voice assistant may make use of any techniques in the field of machine learning or artificial intelligence for facilitating verbal communication with a user. In some embodiments, an intelligent voice assistant could include software making use of natural language processing to process incoming sounds (such as words), interpret the input, and produce audible responses (such as words). More specifically, an intelligent voice assistant could use speech recognition algorithms to process incoming speech, natural language understanding algorithms to determine the content of the speech, and natural language generation algorithms to produce speech that can be understood by a user.

In some embodiments, an intelligent voice assistant can include both a local computing device and a remote assistant services system. In the exemplary embodiment of FIG. 1, intelligent voice assistant 120 includes computing device 121, which may comprise a device with speakers, microphones and processors for interacting verbally with a user. Additionally, intelligent voice assistant 120 may include assistant services system 150 that is in communication with computing device 121. While computing device 121 may be located at the premises of a user (for example, a user's home or office), assistant services system 150 may be located remotely, for example in the cloud.

Assistant services system 150 may provide some of the intelligence and functionality of an intelligent assistant that is accessible over a network, such as the internet. For example, in some embodiments computing device 121 could receive audio information and send that audio information to assistant services system 150 (over network 106) for processing. The results of processing the audio information may then be returned to computing device 121 to be spoken to a user. In other embodiments, this audio information could be processed locally by intelligent voice assistant 120. In some other embodiments, some or all of the provisions of assistant services system 150 could be incorporated locally into computing device 121. Likewise, in some embodiments, some of the provisions described above for intelligent voice assistant 120 may be incorporated into assistant services system 150.

An intelligent voice assistant may be configured with one or more software applications or "apps". In some cases, these software applications may be acquired through an online application store and downloaded to computing device 121. These applications may be stored locally using storage 203 of computing device 121 and run using the at least one processor 202. These applications may use an application program interface to control various onboard components of computing device 121, such as speakers 204, microphones 206 and voice module 210.

In some embodiments, one or more of document explanation module 212, push content module 214, call connection module 216 and/or enhance assistant module 218 may be provided as applications that can be downloaded and installed on computing device 121. In some embodiments, a service provider may create one or more software modules (including any of document explanation module 212, push content module 214, call connection module 216 and/or enhance assistant module 218) so that a user can download and install these modules onto any intelligent voice assistant that they may already own.

It may be appreciated that the form of communication between a user and a representative could vary. User 102 could use device 130 to call, email or text representative 110. Phone calls could be done over a publicly switched telephone network or through the internet, for example, using a voice over IP (VoIP) protocol or through a chat program that supports calls. In addition, intelligent voice assistant 120 could also make calls on behalf of user 102. For example, when device 130 is a smartphone, a Bluetooth connection could be established between device 130 and intelligent voice assistant 120 so that intelligent voice assistant 120 can control user device 130, including making calls and operating as a speakerphone for those calls. As another example, intelligent voice assistant 120 could be capable of initiating a VoIP call to a representative over network 106 without the use of user device 130.

As already mentioned, a common problem for users of various services (for example, banking and insurance services) is trying to make sense of various kinds of documents that may be sent as hard copies (physical documents) or as soft copies (for example, word documents, webpages, PDFs and other kinds of electronic documents). The exemplary system described above may be used to mitigate this problem by configuring an intelligent voice assistant with the ability to respond to user queries about documents they receive. By using intelligent voice assistant to provide document summaries, the system and method may reduce user frustration (and therefore also increase user satisfaction) by reducing the need for the user to call a service representative to ask questions about the document. Furthermore, the system and method can save costs for the service provider by reducing the number of service representatives that need to be available for user questions at a given time, since some of these user questions will be answered automatically by the intelligent voice assistant.

Figure 3:
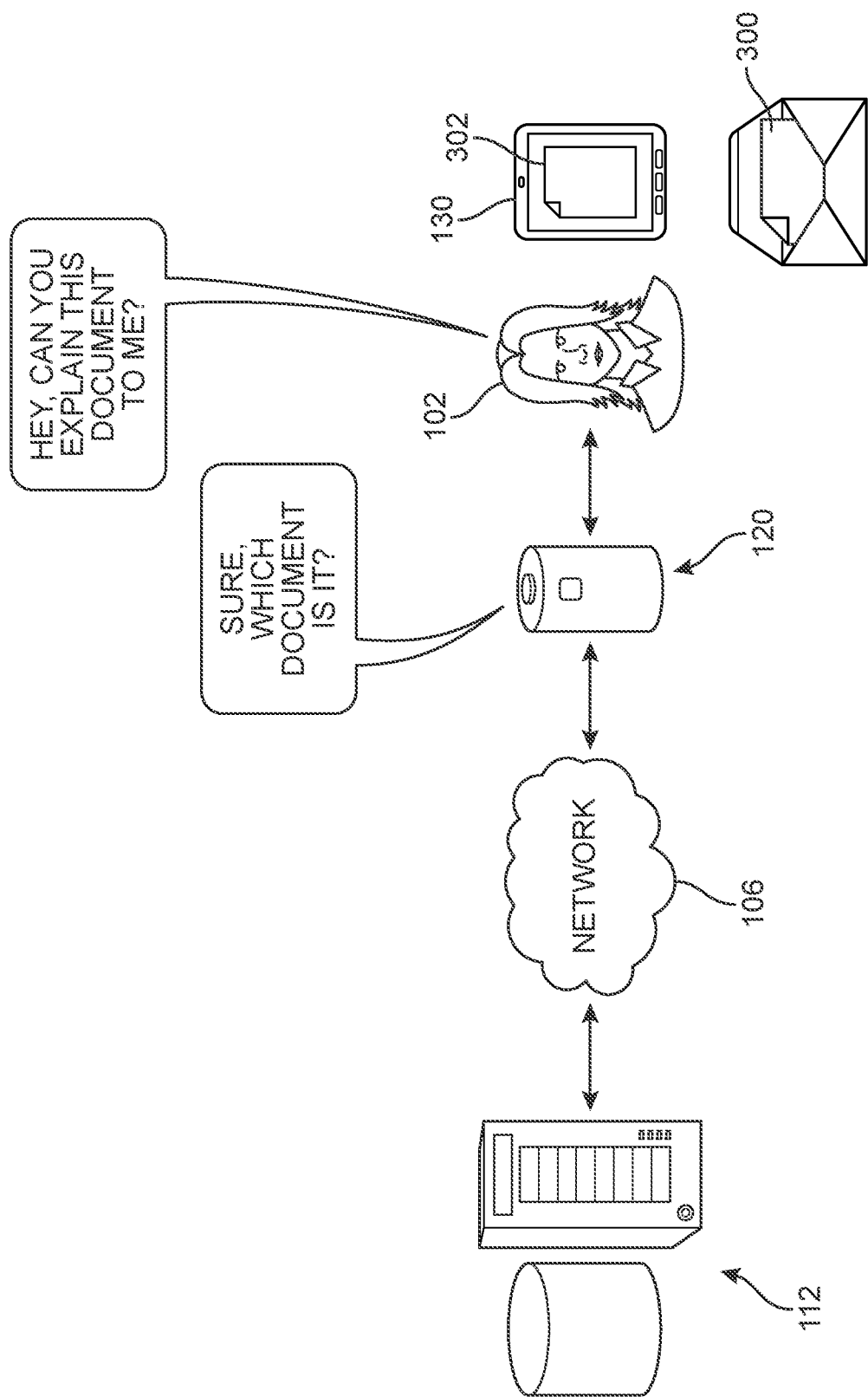
FIG. 3 is a schematic view of a situation where a user asks an intelligent voice assistant to explain a document, according to an embodiment.

As a simple example, FIG. 3 depicts a situation in which a user may have a question about a document they have received. The document could be a hard copy of a document 300 that has been received by physical mail. The document could also be a soft copy of a document 302 that has been received as an attachment in an email.

Referring to FIG. 3, user 102 can ask intelligent voice assistant 120 to explain the document. Specifically, in the example shown in FIG. 3, user 102 asks "Hey, can you explain this document to me?" Often, an intelligent voice assistant makes use of a "wake word." In some cases, the wake word is a name of the device. In this example, the wake word is "Hey" which provides a cue to intelligent voice assistant 120 to pending instructions or questions from the user. In this case, upon hearing the wake word and processing the request to have the document explained, intelligent voice assistant 120 responds with a question. Specifically, intelligent voice assistant 120 asks "Sure, which document?". At this point, the user could provide explicit identifying information about the document (a document number, title, etc.) so that intelligent voice assistant 120 can retrieve information to be used in explaining the document to user 102.

Figure 4:
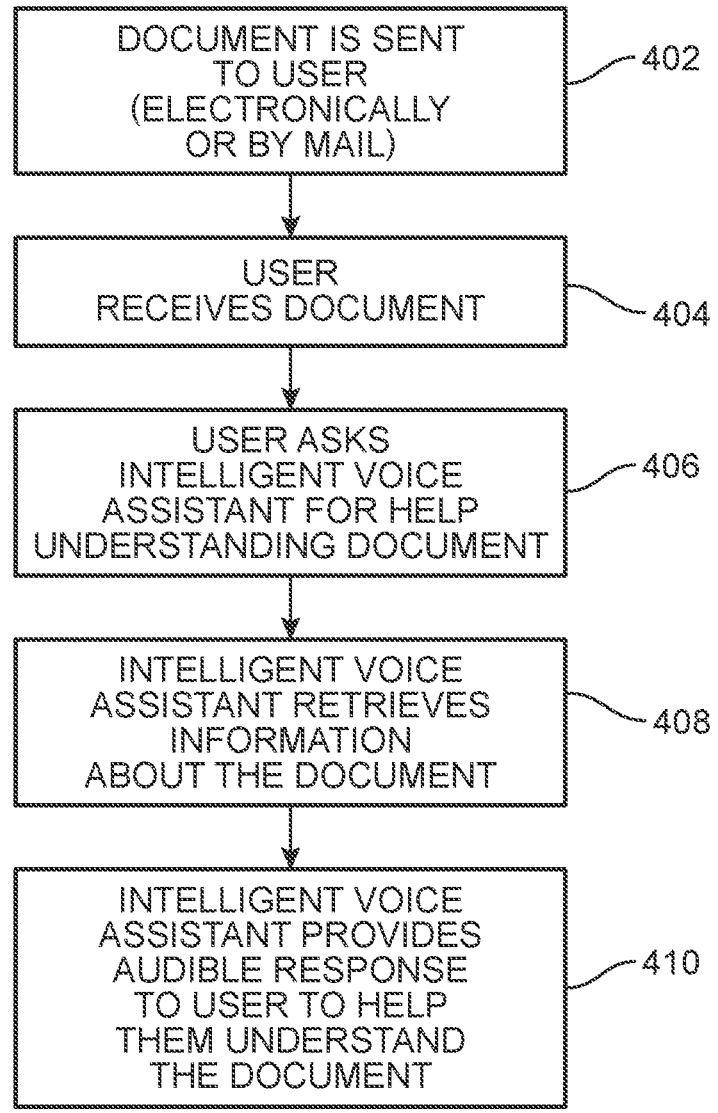
FIG. 4 is a schematic view of a process where a document is sent to a user and explained to the user by an intelligent voice assistant, according to an embodiment.

FIG. 4 is a schematic view of a process where a user receives a document and has an intelligent voice assistant explain the document to them. It may be appreciated that some of the steps described in this process may be performed by an intelligent voice assistant, while other steps could be performed by a representative or other entity associated with a company or other organization. Still other steps are performed by the user.

This exemplary process as well as the other processes described in this detailed description and in the claims could be used with a variety of different kinds of documents. Generally, the type of document used will be dependent on the type of service provided by the company or organization sending the document. Examples of documents could include, but are not limited to: account statements (for example banking statements or credit card statements), tax documents (for example, a W2 or 1099 form), legal contracts, service contracts, insurance claim documents (for example, a document explaining how a particular insurance claim has been resolved), loan statements or forms, and bills for services.

In a first step 402, a document is sent to a user. The document could be sent electronically or by physical mail. Next, in step 404, the user receives the document. In step 406, the user asks an intelligent voice assistant for help understanding the document. Specifically, the user provides an audible question to the intelligent voice assistant. The intelligent voice assistant is capable of hearing the question, processing the content of the question and providing an audible response. The format of the question could vary. In some cases, an intelligent voice assistant may only respond to very specific semantic forms of the question, including, possibly, a specific string of words (such as "explain my document"). In other cases, an intelligent voice assistant may be smart enough to understand the content of the user's question even though it may be provided in a variety of different forms (such as "explain this," or "what's this document about?").

As discussed in the scenario shown in FIG. 3, an intelligent voice assistant may be configured to ask follow up questions to a user if there is insufficient information to perform a task, such as providing a document summary. An intelligent voice assistant could ask for details about the document such as the document title, the date the document was sent (or arrived), the originating department for the document (for example in the context of an insurance service provider, was it sent by the claims department or another department?), as well as other suitable details that could help the intelligent voice assistant retrieve the referenced document.

After receiving instructions to explain the document, the intelligent voice assistant may retrieve information about the document in step 408. The information could be retrieved from a local database, from a database associated with an assistant services system, and/or from a database associated with any other computer system operated by the service provider. Finally, after retrieving the necessary information, the intelligent voice assistant may provide an audible response to the user in step 410. This audible response may include a suitable subset of information contained in the document or a summary of the document that is not explicitly contained in the document itself.

As used herein, the term "summary information" may refer to information that conveys a summary, or key points, of a document. Often, financial and other legal documents that are sent to users may contain many pages of information. It is often too tedious and time consuming for a user to read and understand every word. The summary information provided by an intelligent voice assistant can provide high level summaries of different sections of the document, or even of only the most important sections. For example, if a user receives a document related to an insurance claim, the summary information corresponding to the document could include statements like "this is a claim document explaining how your insurance claim request has been resolved. The insurer has agreed to cover the full cost of replacing your car." Summary information can include general content that applies to the document more broadly, such as the type of document, the type of information it conveys and specific actions that the user may be required to take (for example, signing part of the document). Summary information can also include customized or user-specific content, such as the specific details related to a claim request for a particular user. Summary information could include explicit dialogue that an intelligent voice assistant should use when responding to a user, or information that may be used by the intelligent voice assistant to generate dialogue on the fly.

While FIG. 4 depicts a general process in which an intelligent voice assistant retrieves summary information for explaining a document to a user, the specific steps performed may depend on how the summary information is stored. In one embodiment, shown schematically in FIG. 5, intelligent voice assistant 120 makes a call to computer system 112 requesting summary information. As part of the request, intelligent voice assistant 120 may provide user identifying information as well as document identifying information. In response, computer system 112 may send a message containing summary information for the document. This document specific information may include both general content and user-specific content. In some cases, the response includes the explicit string of words that intelligent virtual assistant 120 should provide to the user. In other cases, the response includes information that intelligent virtual assistant 120 processes to generate an explanation that is spoken to the user.

Figure 5:
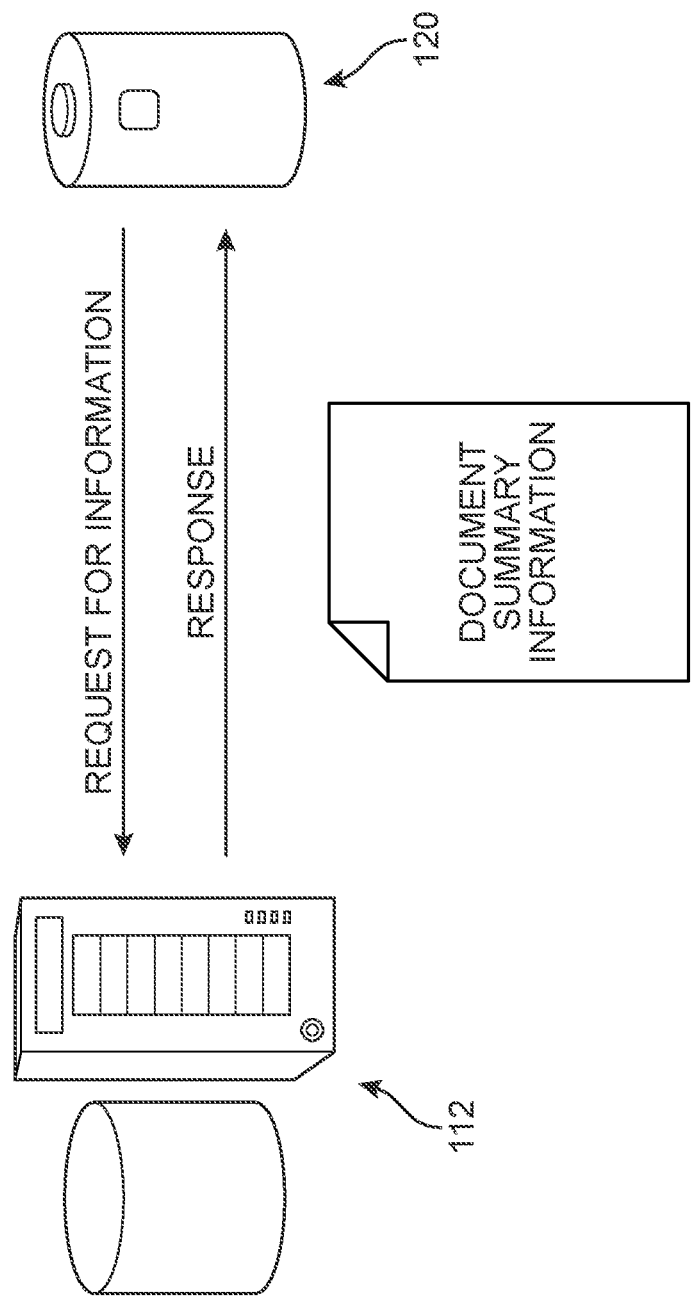
FIG. 5 is a schematic view of a configuration for storing and retrieving summary information for a document, according to an embodiment.
Figure 6:
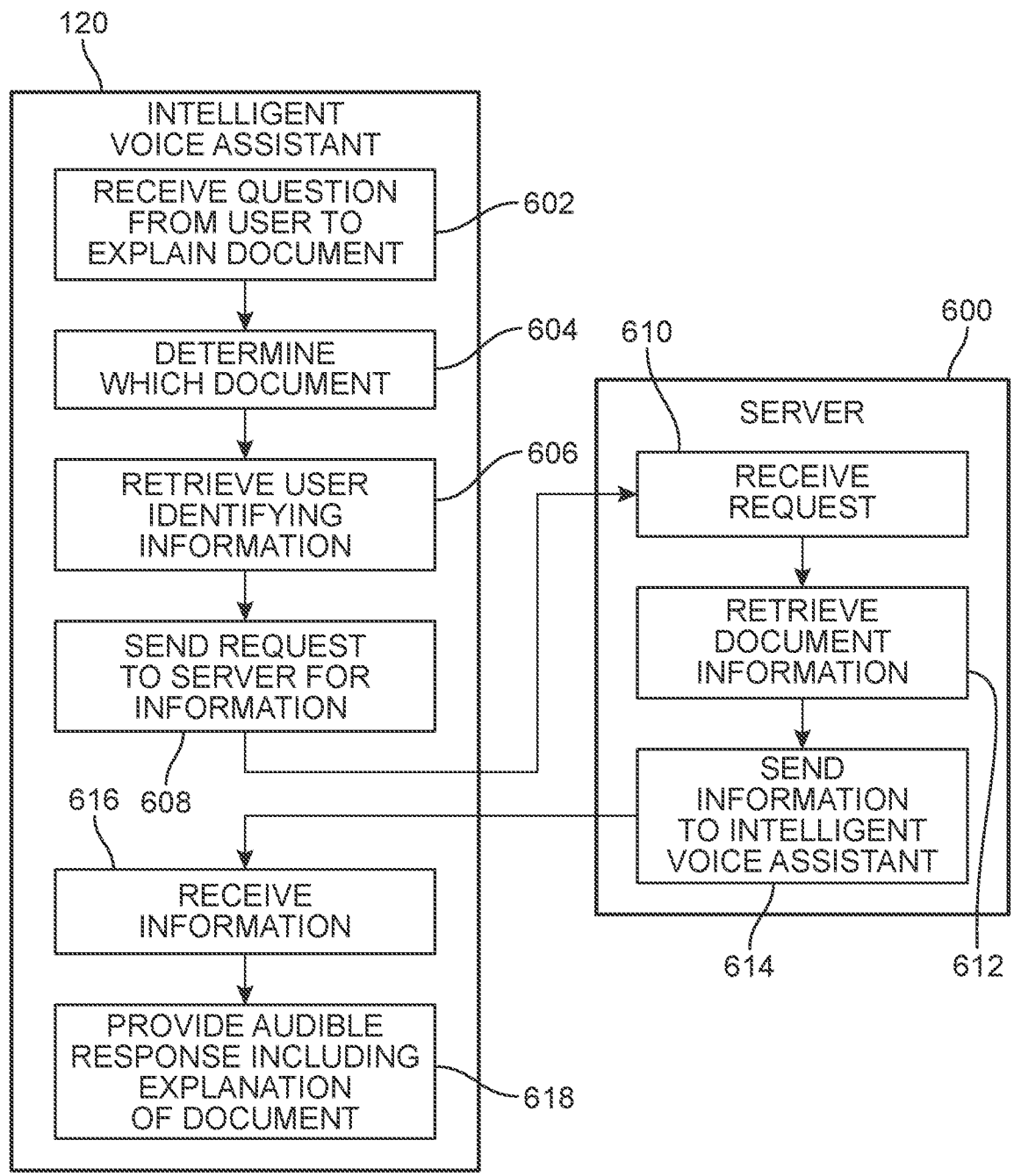
FIG. 6 is a schematic view of process for retrieving summary information for a document from a server, according to an embodiment.

FIG. 6 depicts a process of explaining a document using the data configuration depicted in FIG. 5. The process depicted in FIG. 6 occurs between intelligent voice assistant 120 and a server 600 of computer system 112. Here it may be understood that server 600 runs software capable of receiving requests from an intelligent voice assistant, processing those requests (including looking up data in databases 114) and providing a response to intelligent voice assistant 120. For convenience, the following discussion describes decisions and actions taken by devices. However, it may be appreciated that these actions are taken by software running on those devices. For example, steps in the following process may be taken by document explanation module 212 of intelligent voice assistant 120 (see FIG. 2). Still other processes could be performed by any of the modules discussed above and shown in FIG. 2.

In a first step 602, intelligent voice assistant 120 receives a question from a user to explain a document. This question may be detected as audible information from the user through one or more of microphones 206 of intelligent voice assistant 120. In other embodiments, the question could be detected as audible information from the user through any other microphone or sensor that is in communication with intelligent voice assistant 120. In some cases, the user may explicitly provide identifying information about the document as part of their original question. For example, the user may ask "Hey, explain insurance claim document X1200 to me." However, in cases where there is ambiguity about which document the user means, intelligent voice assistant 120 could take further steps to determine the specific document being requested in step 604. In some cases, intelligent voice assistant 120 can ask the user a follow up question, as in the example depicted in FIG. 3, to determine which document is being referenced. In other cases, intelligent voice assistant 120 could have access to user records to indicate what documents have recently been sent to the user. This may allow intelligent voice assistant 120 to make an informed guess about the particular document being referenced by the user.

After determining the specific document being referenced, intelligent voice assistant 120 may retrieve user identifying information in step 606. This information could be stored locally, and could include information such as the user's name, an account number, or other identifying information that can be used to identify the user in a request to the server. Next, in step 608, intelligent voice assistant 120 may send a request to the server for summary information about the referenced document.

The request is received by server 600 in step 610. In step 612, server 600 may retrieve the document summary information. In some cases, document summary information for each type of document is created ahead of time and stored in computer system 112. In some cases, this summary information can be stored as template information that is populated with specific user content at the time of retrieval. In this way, the general content can be provided as a template for a given type of document (for example, a specific form) that can be filled in with specific user content to customize it for a user.

In step 614, server 600 sends the summary information back to intelligent voice assistant 120, which receives the information at step 616. Finally in step 618, intelligent voice assistant 120 provides an audible response to the user. As part of this audible response intelligent voice assistant 120 explains the document to the user.

Figure 7:
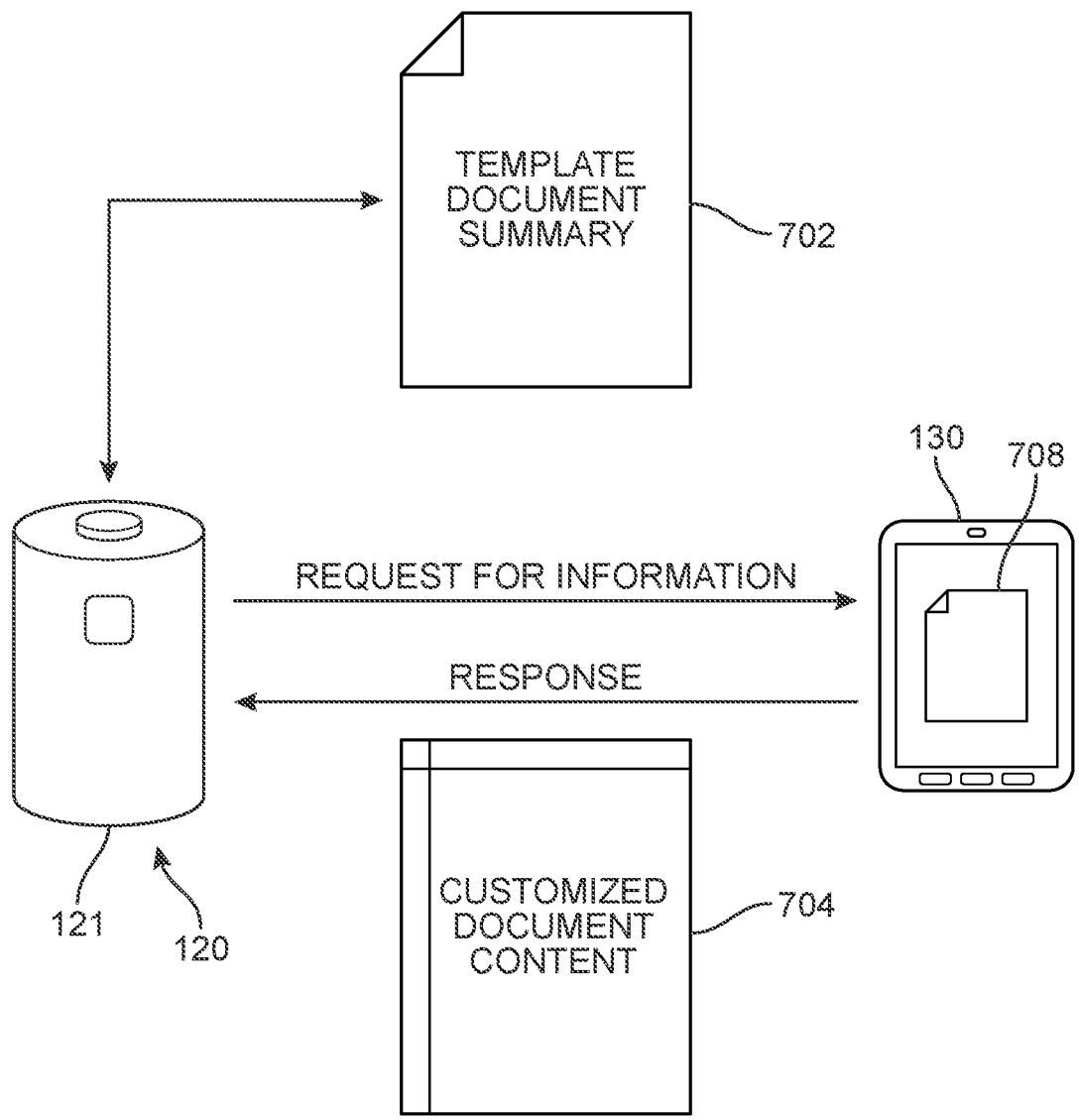
FIG. 7 is a schematic view of a configuration for storing and retrieving summary information for a document, according to another embodiment.

In another embodiment, shown schematically in FIG. 7, intelligent voice assistant 120 could combine template document summaries 702 with customized document content 704 to create an explanation of the document for the user. As seen in FIG. 7, template document summaries 702 could be stored locally as part of computing device 121 of intelligent voice assistant 120. If the document is provided as a soft copy, for example a document 708 stored on a user device 130, then intelligent voice assistant 120 can request customized document information 704 from user device 130. In other embodiments, template document summaries 702 could be stored on computer system 112 or on another server/database that is accessible over the internet or other network. Likewise, in other embodiments, customized document content 704 could be retrieved from computer system 112 rather than from user device 130.

Figure 8:
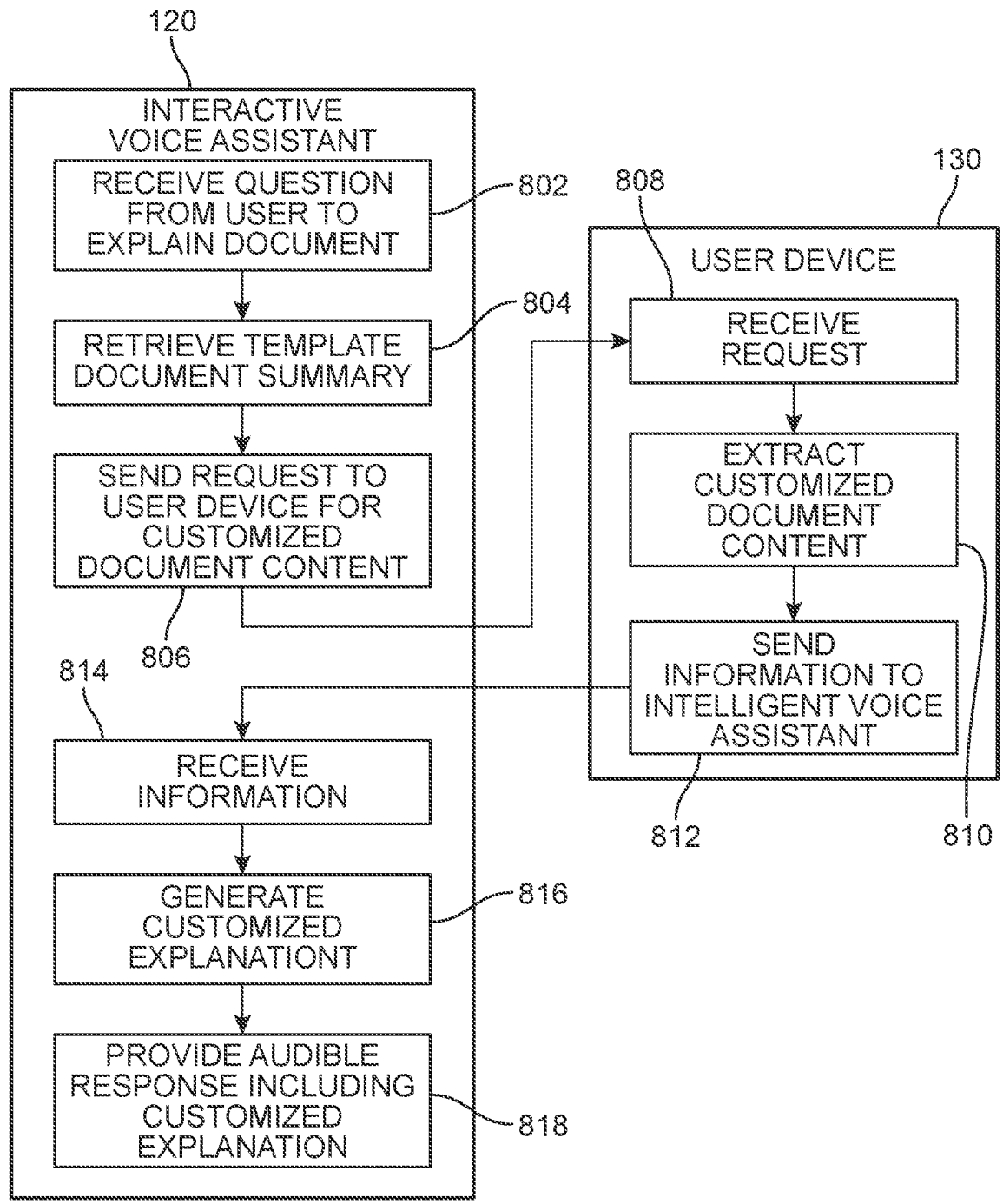
FIG. 8 is a schematic view of a process for retrieving summary information for a document from a user device, according to an embodiment.

FIG. 8 depicts a process for the configuration depicted in FIG. 7. The process depicted in FIG. 8 occurs between intelligent voice assistant 120 and a user device 130, which may include a locally stored copy of the referenced document. Here it may be understood that user device 130 runs software capable of receiving requests from an intelligent voice assistant, processing those requests (including extracting data from a copy of the document) and providing a response to intelligent voice assistant 120. In a first step 802, intelligent voice assistant 120 receives a question from a user to explain a document. As before, in some cases, intelligent voice assistant 120 could ask follow up questions to determine which document the user is referencing.

Next, in step 804, intelligent voice assistant 120 may retrieve a template document summary for the referenced document. For example, intelligent voice assistant 120 may query a local database associated with computing device 121. Next, in step 806, intelligent voice assistant 120 may send a request to user device 130 for customized document content.

In step 808, user device 130 receives the request and proceeds to extract the customized document content from the soft copy of the document in step 810. This information is then sent to intelligent voice assistant 120 in step 812.

After receiving the customized document content in step 814, intelligent voice assistant may generate a customized explanation of the document using both the template document summary and the customized document content in step 816. Finally, in step 818, intelligent voice assistant 120 provides an audible response to the user including a customized explanation of the document.

Many users of a service often want to know if a document they've received is a bill that must be paid, a form that must be signed, or if the document is simply providing information (like an account statement from a bank). An intelligent voice assistant can be configured to help users quickly determine if a given document is a bill, some other form that requires action, or something that requires no action (or no urgent action).

Figure 9:
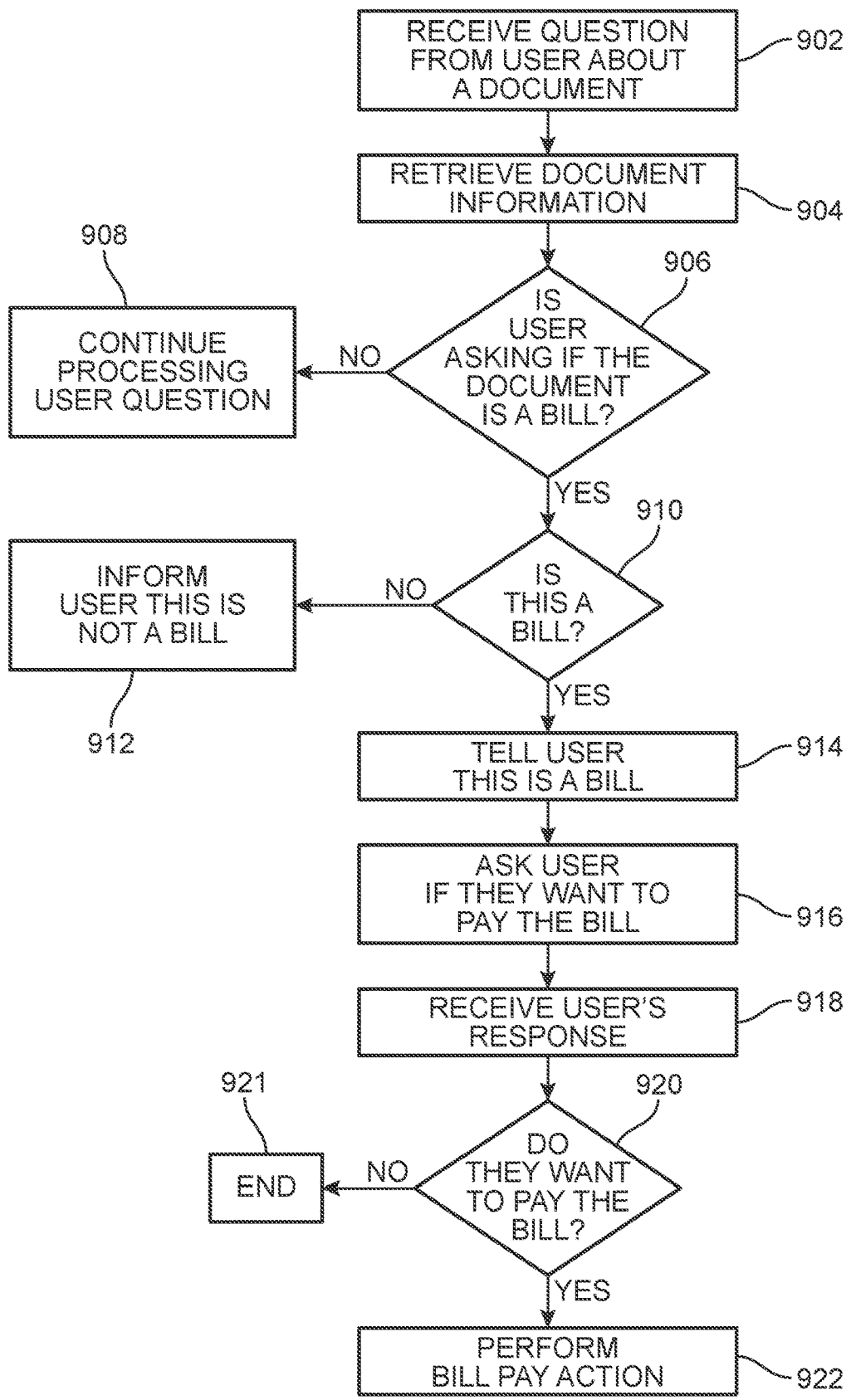
FIG. 9 is a schematic view of a process of helping a user understand if a document is a bill and helping the user pay the bill, according to an embodiment.

FIG. 9 is a schematic view of a process for helping a user determine if a given document is a bill and for facilitating the payment of that bill. In a first step 902, intelligent voice assistant 120 may receive a question from a user about a document. Next, in step 904 intelligent voice assistant 120 may retrieve information about the document. Any of the methods described above, and depicted in FIGS. 5-8, could be used to retrieve document information, including summary information for a document. Next, in step 906, intelligent voice assistant 120 determines if the user is asking if the document is a bill. If not, then intelligent voice assistant 120 proceeds to step 908 to continue processing the user question. If the user is asking if the document is a bill, then intelligent voice assistant 120 proceeds to step 910. In step 910 the voice assistant determines if the document is a bill based on the retrieved document information from step 904. If not, intelligent voice assistant 120 proceeds to step 912 to inform the user that the document is not a bill. If the document is a bill, intelligent voice assistant 120 proceeds to step 914 to inform the customer that the document is a bill.

Next, in step 916, intelligent voice assistant 120 can ask the user if they would like to pay the bill. In step 918, intelligent voice assistant 120 waits for a response. If the user wants to pay the bill, as determined in step 920, intelligent voice assistant 120 may perform a bill payment action in step 922. If the user doesn't want to pay the bill, the process ends in step 921.

In some cases, as part of a bill payment action, intelligent voice assistant 120 may request an automatic payment on the user's behalf. In other cases, intelligent voice assistant 120 may assist the user with online bill payment options. Automatic payments could be made in cases where a user has preauthorized intelligent voice assistant 120 to make some kinds of payments. For example, an intelligent voice assistant 120 could be configured to initiate a bill payment action whenever a user says "pay my bill now." If there is not a preauthorized means for making automated payments in this way, intelligent voice assistant 120 could help a user navigate an online bill pay service from user device 130. For example, intelligent voice assistant 120 could provide step by step instructions for paying the bill online. In some cases, intelligent voice assistant 120 could control the user's screen and automatically navigate to the bill pay option of a website or native application. Methods for automatically navigating to various parts of a website or native application are discussed in further detail below and depicted schematically in FIGS. 12-18.

In embodiments where a service provider has a phone based bill payment system, allowing users to make payments over the phone, intelligent voice assistant 120 could initiate a call to the phone based bill payment system. Methods for automatically making calls for a user are discussed in further detail below and depicted schematically in FIGS. 19-27.

Figure 10:
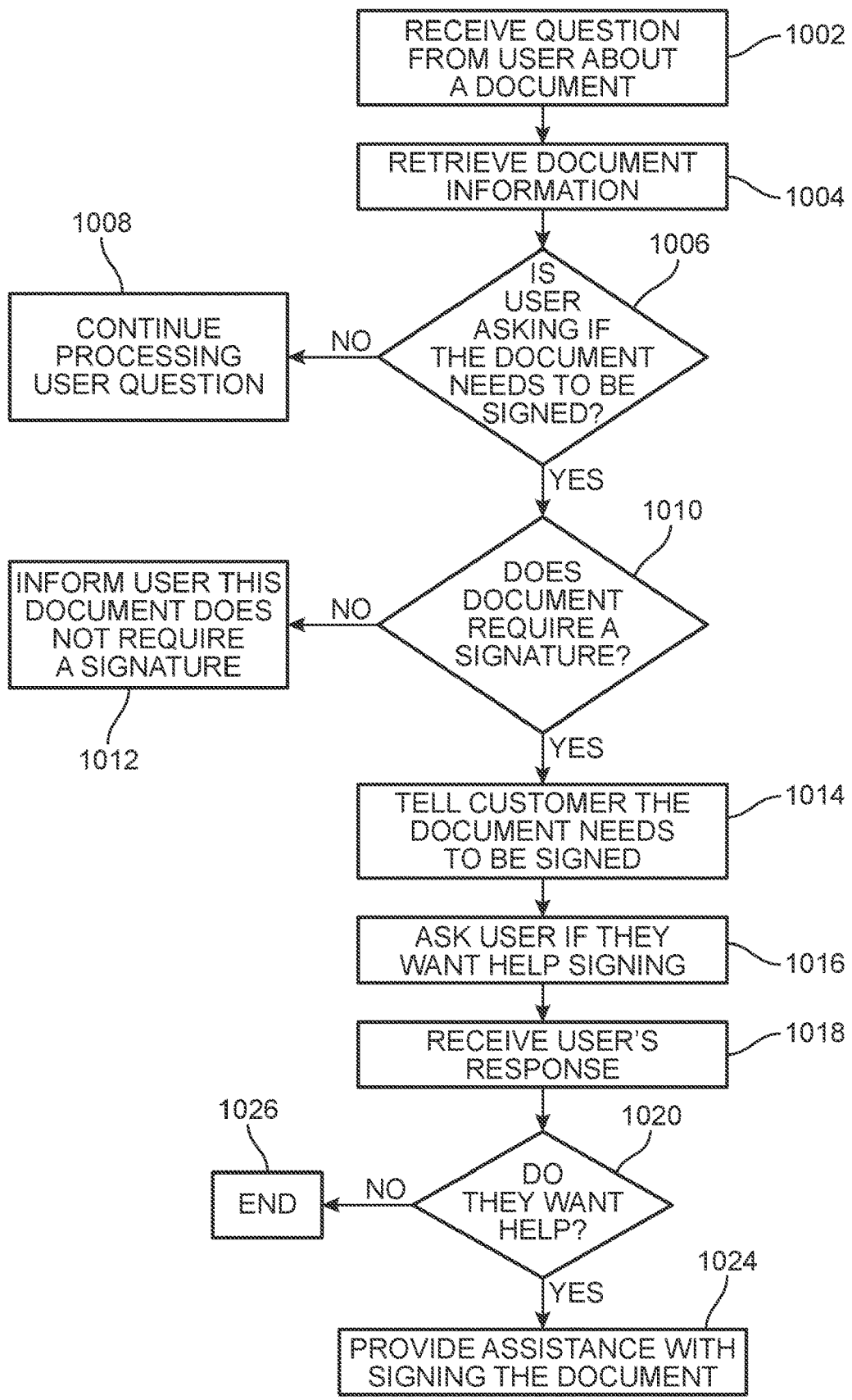
FIG. 10 is a schematic view of a process of helping a user understand if a document requires a signature and helping the user sign the document, according to an embodiment.

FIG. 10 is a schematic view of a process for helping a user determine if a document needs to be signed and helping the user to sign the document when the document is an e-document. In a first step 1002, intelligent voice assistant 120 may receive a question from a user about a document. Next, in step 1004 intelligent voice assistant 120 may retrieve information about the document. Any of the methods described above, and depicted in FIGS. 5-8, could be used to retrieve document information, including summary information for a document. Next, in step 1006, intelligent voice assistant 120 determines if the user is asking if the document needs to be signed. If not, then intelligent voice assistant 120 proceeds to step 1008 to continue processing the user question. If the customer is asking if the document needs to be signed, then intelligent voice assistant 120 proceeds to step 1010. In step 1010 the voice assistant determines if the document is needs to be signed based on the retrieved document information from step 1004. If not, intelligent voice assistant 120 proceeds to step 1012 to inform the user that the document doesn't need to be signed. If the document needs to be signed, intelligent voice assistant 120 proceeds to step 1014 to inform the customer that the document needs to be signed.

Next, in step 1016, intelligent voice assistant 120 can ask the user if they would like help signing the document. In step 1018, intelligent voice assistant 120 waits for a response. If the user wants to help, as determined in step 1020, intelligent voice assistant 120 may provide assistance with signing the document in step 1024. Otherwise, the process ends at step 1026.

Intelligent voice assistant 120 may provide different options for assisting with a signature, depending on the capabilities of the document itself and of the user device 130. For example, in some cases user device 130 could have a sensor for fingerprint recognition that can be used to authorize an e-signature. Alternatively, in some cases, a user could trace out a signature on user device 130 or provide an automatically generated signature. In addition to helping a user sign an e-document, intelligent voice assistant 120 could also provide assistance in locating the part(s) of a document where a signature is required. Methods for automatically navigating to various parts of a website or native application are discussed in further detail below and depicted schematically in FIGS. 12-18.

As already mentioned, another common problem for users of various services is trying to locate the sections of any electronic documents, forms, or webpages that may be most relevant. The exemplary system described above may be used to mitigate this problem by providing an intelligent voice assistant with the ability to push content to a user and/or automatically change what a user sees on their device. For example, an intelligent voice assistant may have the ability to force a user's device to navigate to a specific part of an electronic document. By pushing content to a user's device and/or controlling what the user sees, the system and method can improve the user experience and save the user time.

Figure 11:
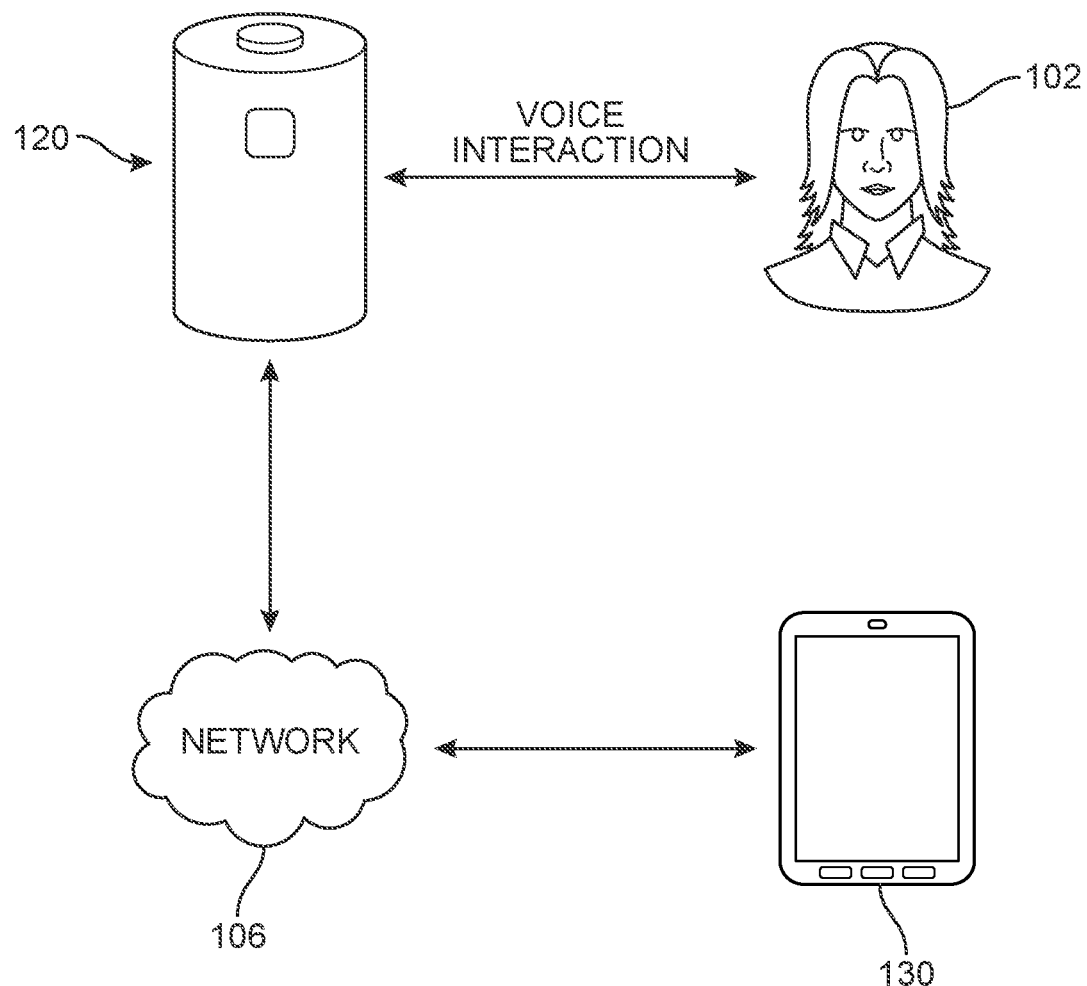
FIG. 11 is a schematic view of a configuration where a user interacts with an intelligent voice assistant, and where the intelligent voice assistant can communicate with a user's device over a network, according to an embodiment.

FIG. 11 is a schematic view of a configuration where an intelligent voice assistant can control what is seen on the user's device. Referring to FIG. 11, intelligent voice assistant 120 can communicate with user device 130 through network 106. The network could be the internet, or a local wireless network, for example. In some cases, these devices can establish communication using a personal area network. Additionally, user 102 can interact with intelligent voice assistant 120 using speech commands. User 102 can also control user device 130 to view documents or perform other tasks.

Figure 12:
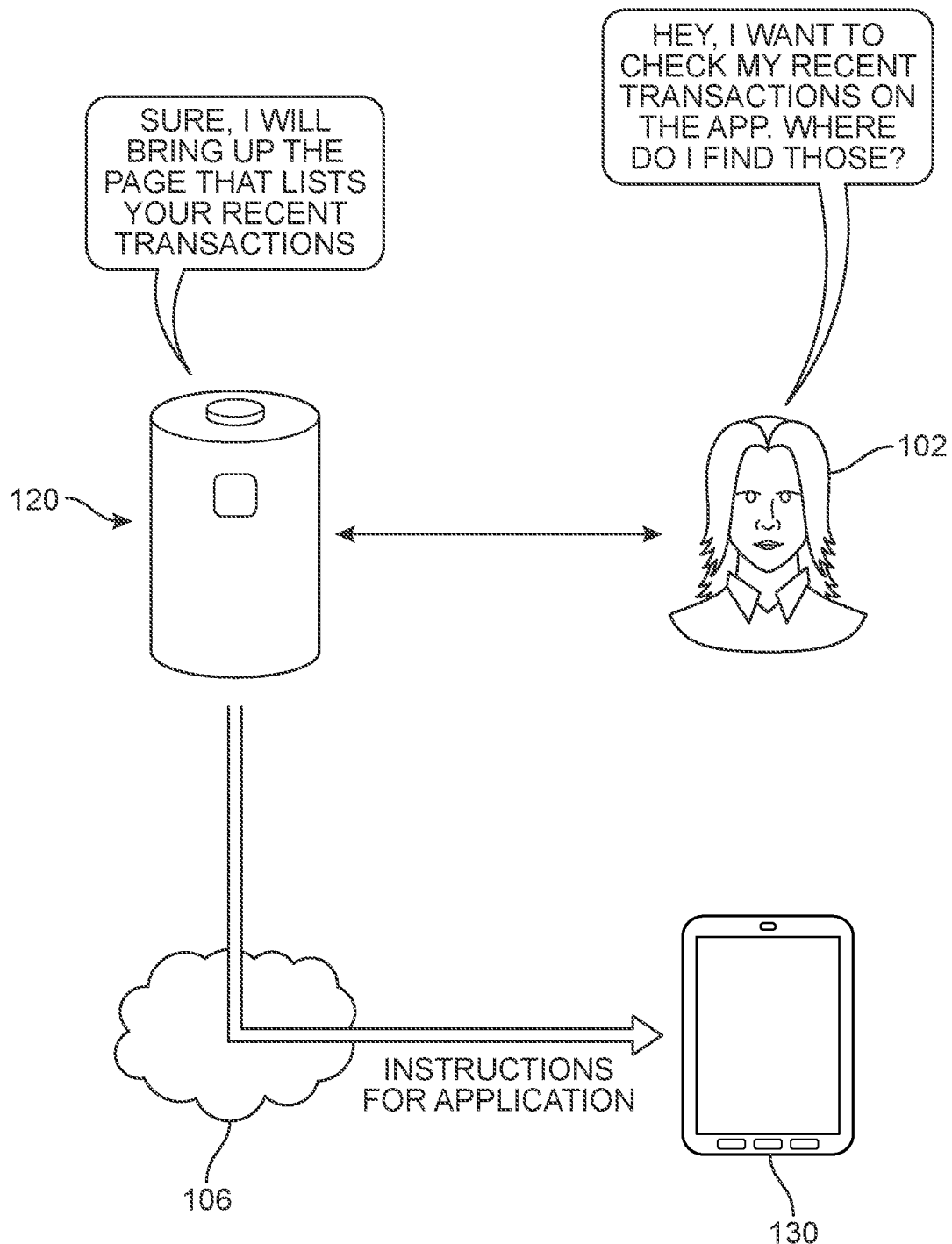
FIG. 12 is a schematic view of a situation where an intelligent voice assistant sends instructions to a user's device for the purpose of displaying a particular part of a document, according to an embodiment.

FIG. 12 is a schematic view of an example interaction in which a user requests assistance and an intelligent voice assistant provides assistance by controlling the content that the user sees on her screen. Referring to FIG. 12, user 102 asks the assistant "Hey, I want to check my recent transactions on the app. Where do I find those?" Here, the user is referring to a page or view within an application on their device that allows them to see their recent transactions for a particular banking account. In response to this question, intelligent voice assistant 120 responds "Sure, I will bring up the page that lists your recent transactions." At this point, intelligent voice assistant 120 proceeds to generate instructions for the application running on user device 130. These instructions could be generated by push content module 214 of intelligent voice assistant 120 and sent to an API 1302 of a mobile banking application 1304 running on user device 130, as shown schematically in FIG. 13. Specifically, using API 1302 (application programming interface) push content module 214 can instruct mobile banking application 1304 navigate to the desired page or view where the user is able to see their recent transactions. To facilitate this functionality, API 1302 may be programmed to allow this kind of control by an intelligent voice assistant or other authorized agent.

Throughout this detailed description and in the claims, the term "view" is used to refer to content of an electronic document that can be displayed to a user. In the context of webpages, a view could be a webpage, a portion of a webpage, the content of a specific HTML element within a webpage (such as a specific DIV element), or any other viewable content. In the context of other kinds of electronic documents such as word documents and PDFs, a view may refer to a page of the document, a portion of a page, a particular section or subsection of the document, a form area within the document or any other viewable content.

Figure 14:
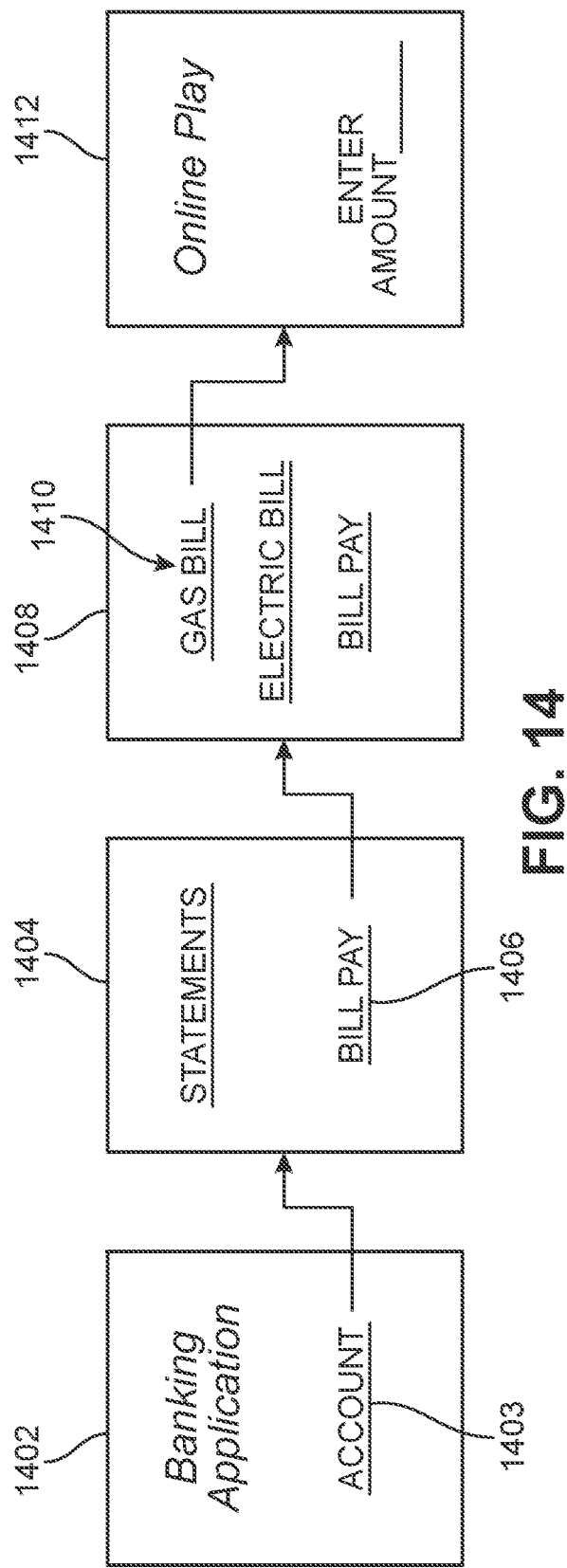
FIG. 14 is a schematic view of a series of views for paying a bill, according to an embodiment.
Figure 15:
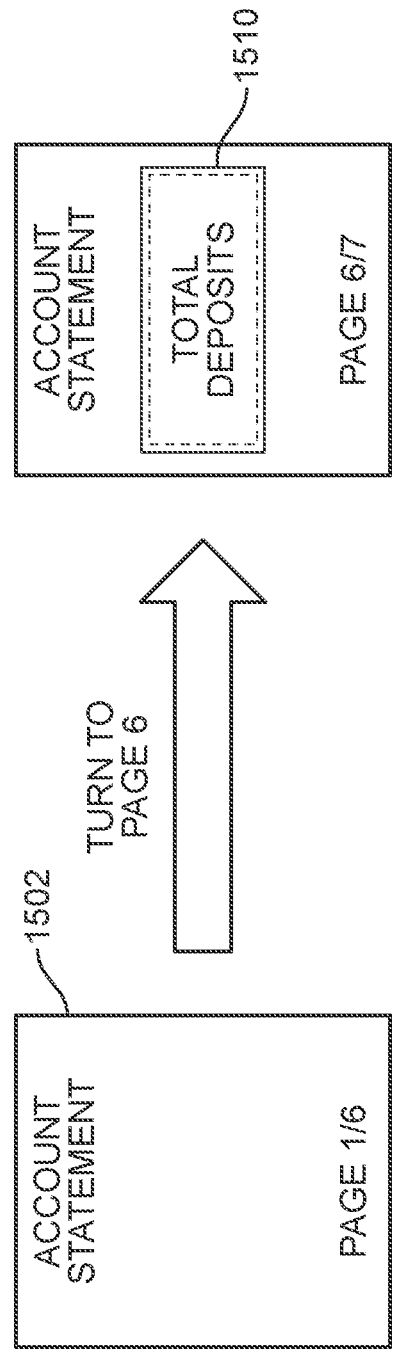
FIG. 15 is a schematic view of a set of views for a multi-page document, according to an embodiment.

FIG. 14 is a schematic view of a sequence of views in the context of a banking application 1304. Starting from a home view 1402, selecting an account link 1403 (or menu item) will bring a user to an account options view 1404. From here selecting a bill pay link 1406 will bring a user to a billing accounts view 1408. From here selecting a gas bill link 1410 will bring a user to a gas bill payment form view 1412, where a user can enter information into a form to have a bill paid. To reduce the need for users to manually navigate through each intermediate view between home view 1402 and payment form view 1412, an intelligent voice assistant can automatically instruct the banking application 1402 to navigate directly to gas bill payment form view 1412.

Figure 13:
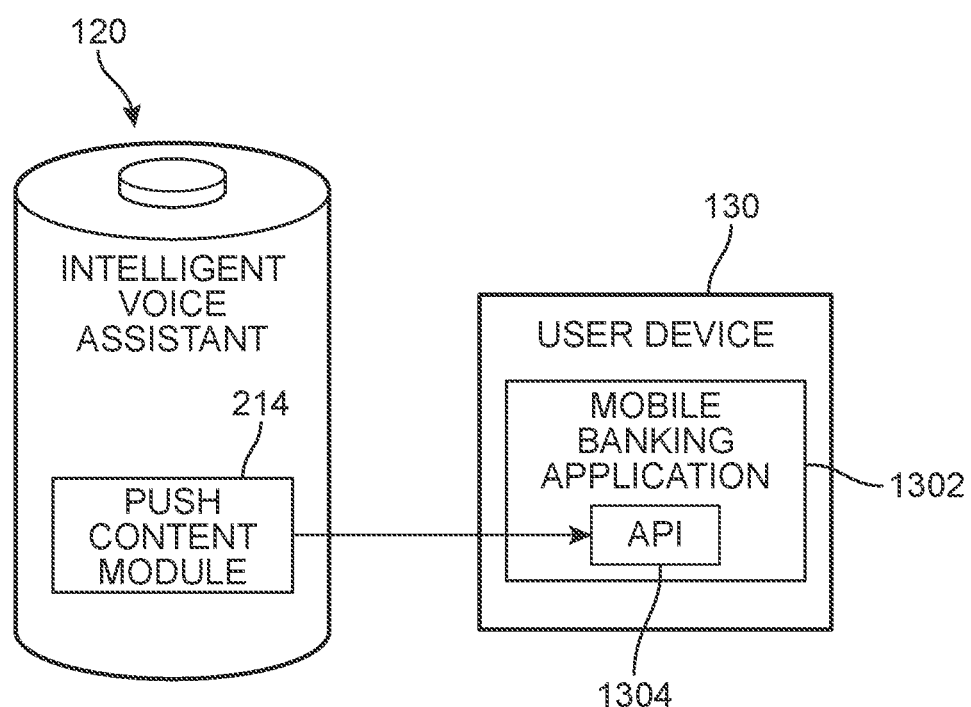
FIG. 13 is a schematic view of a system for sending viewing instructions to a user device, according to an embodiment.

For example, if a user is having problems finding the page within the application where they can pay their gas bill, they can simply tell intelligent voice assistant 120 to "Show me where I pay my gas bill." In response to this request, intelligent voice assistant 120 can make a call to API 1302 of banking application 1304 (see FIG. 13). As part of this call, intelligent voice assistant 120 may request that banking application 1304 show gas bill payment form view 1412. From the user's point of view they may simply see the screen change automatically from whatever they are currently looking at to gas bill payment form view 1412. At this point, user 102 may further request assistance in filling out the form, or may fill the form out without assistance.

Although the embodiment of FIG. 14 depicts views within a native software application running on a mobile device, a similar configuration may apply to other types of documents displayed using other kinds of software. For example, a similar configuration may apply to webpages running on a browser of user device 130.

The views of an electronic document, such as a word document or PDF, may also be controlled by an intelligent voice assistant. In the embodiment shown in FIG. 15, an account statement 1502 is shown. Account statement 1502 includes 7 pages of material, much of which may not be of interest to a user. An intelligent voice assistant can therefore automatically navigate to a different view in the document that contains the information a user wants. In this case, after a user has asked "what are my total deposits this month?", intelligent voice assistant 120 automatically turns the document to page 6, where the desired information is located. Moreover, intelligent voice assistant 120 highlights a total deposits view 1510 within page 6, so the user can focus on only the content on page 6 that they care about.

Figure 16:
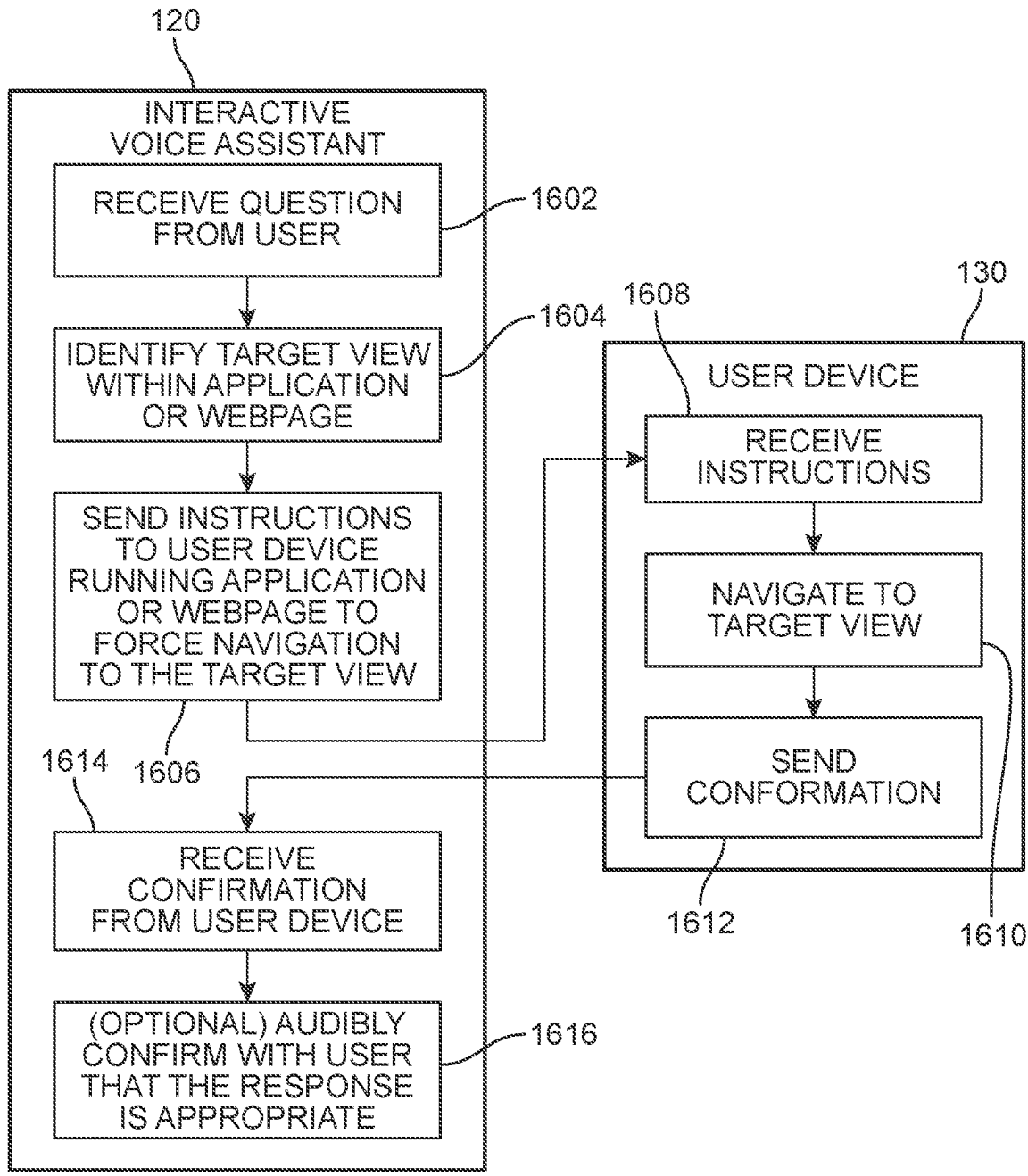
FIG. 16 is a schematic view of a process for controlling a view on a user's device, according to an embodiment.

FIG. 16 is a schematic view of a process for pushing content or controlling the viewed content on a user device. In a first step 1602, intelligent voice assistant 120 receives a request or question from a user. The request may be related to a document. For example, the request to could be to help the user find a signature line in a document, or the part of a document where a user can enter information (for example, within a web form). Based on the request, intelligent voice assistant 120 may identify a target view within the associated application or webpage in step 1604. The target view is a view within the document that contains the content (or functionality) that the user is requesting.

After identifying the target view, intelligent voice assistant 120 may send instructions to user device 130 running a native application or webpage in step 1606. Specifically, intelligent voice assistant 120 may provide instructions for the native application or webpage to show the target view. In some cases, the system may allow intelligent voice assistant 120 to go directly to a target view. In other cases, the system may require that intelligent voice assistant 120 provide step-by-step instructions for navigating from the current view to the target view. For example, in the set of views depicted in FIG. 14, intelligent navigation assistant 120 could provide a sequence of instructions, including selecting account link 1403, then selecting bill pay link 1406, and finally selecting gas bill link 1410.

The instructions are received by an application running on user device 130 in step 1608. In some cases, the instructions are provided by means of API 1302. The application may execute the instructions in step 1610, so that the target view is displayed on user device 130. In step 1612, the application may send a confirmation that it has executed the instructions successfully without errors.

In step 1614, intelligent voice assistant 120 receives confirmation from user device 130 that the target view is being displayed. In an optional step 1616, intelligent voice assistant 120 could audibly confirm with the user that the response is appropriate. That is, intelligent voice assistant 120 may confirm that the target view includes the content the user wanted to find.

Figure 17:
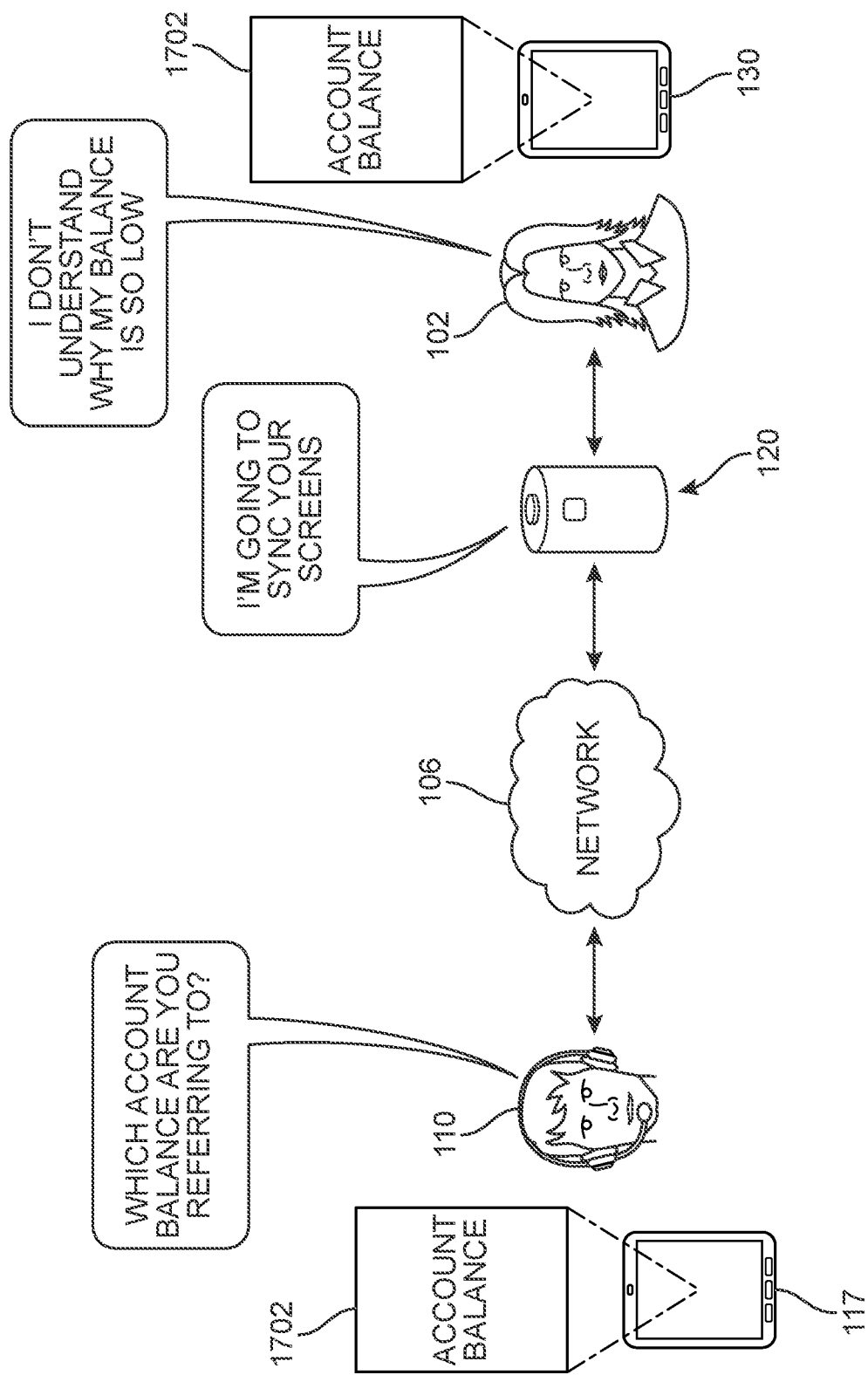
FIG. 17 is a schematic view of a configuration where an intelligent voice assistant syncs the views of a user and a service representative during a call, according to an embodiment.

In another embodiment, depicted schematically in FIG. 17, an intelligent voice assistant could push content, or control the views, of both a user's device and a representative's device during a call. This allows the intelligent voice assistant to sync the views between the user and representative so the representative can better understand the user's needs.

Referring to FIG. 17, during a call with representative 110, user 102 asks "I don't understand why my balance is so low." In response, representative asks a question, "which account balance are you referred to?". Detecting possible confusion between the two parties in this situation, intelligent voice assistant 120 offers to sync the screens (that is, the views) of their respective devices. The result is the user's account balance page 1702 is displayed on both user device 130 and representative device 117, so that representative 110 can easily understand the context of the user's questions.

Figure 18:
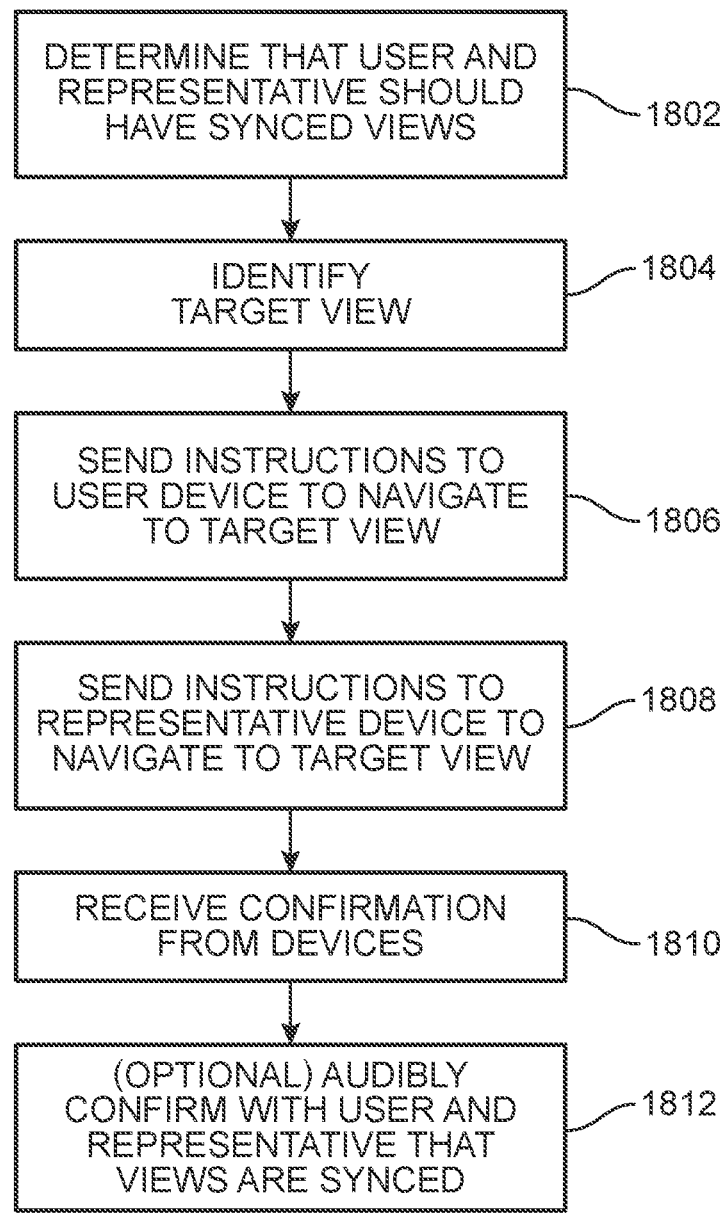
FIG. 18 is a schematic view of process for syncing the views of a user and a service representative during a call, according to an embodiment.

A process for pushing or controlling content of both a representative and a user is shown in FIG. 18. In a first step 1802, intelligent voice assistant 120 determines that the user and representative should have synced views. Next, in step 1804, intelligent voice assistant 120 identifies a target view. The target view may be either the current view of the user, the current view of the representative, or some other view. Next, in step 1806, intelligent voice assistant 120 sends instructions to an application running on the user device to navigate to the target view. In step 1808, intelligent voice assistant 120 sends a similar instruction to an application running on the representative device to navigate to the target view. In step 1810, intelligent voice assistant 120 may receive confirmation from both devices. And in an optional step 1812, intelligent voice assistant 120 may audibly confirm with the user and representative that the views are synced to the target view.

Control of representative device 117 may be similar to the method of controlling user device 130 discussed above and shown in FIG. 13. Specifically, push content module 124 of intelligent voice assistant 120 may communicate with an API (similar to API 1302) of an application running on representative device 117. Because internet voice assistant 120 may not be located near representative device 117, communication between the devices may take place over the internet.

Using system and methods described above and shown in FIGS. 17-18, an intelligent voice assistant could also push content and/or control the views of devices for a representative. For example, if a user has a question about a hard copy document, the user could take a photo of the document using their device and ask the intelligent voice assistant to send the photo to the representative. The intelligent voice assistant could send the photo to the representative and also control the representative device so that the photo is instantly opened on a part of the representative's screen.

In addition to syncing views of a portion of a document between a user and a representative, an intelligent voice assistant could also be configured to share the user's whole screen, or simply a part of the screen, with a representative (or vice versa). Having the ability to only share part of a user or representative's screen increases the privacy of the user and/or representative.

An intelligent voice assistant may be able to project shared views or screens onto a variety of different connected devices. These include any television screens, monitors, tablets or other connected devices that the intelligent voice assistant can communicate with. Moreover, the embodiments could use any kind of screen sharing technology known in the art.

To facilitate syncing document views and/or sharing screens, embodiments may use any known remote desktop software and/or protocols known in the art. Examples of remote desktop protocols include, but are not limited to: the appliance link protocol, the NoMachine NX protocol, the PC-over-IP protocol, the remote desktop protocol, the remote frame buffer protocol, as well as other suitable protocols.

Many users may find the process of calling a company or organization to get ahold of a representative tedious and stressful. This may be especially true when users have to navigate a phone tree intended to route people to different representatives or recordings based on their selections. The exemplary system described above may be used to mitigate this problem by configuring an intelligent voice assistant with the ability to connect a user to a representative without requiring the user to go through a phone tree. In some cases, the intelligent voice assistant may be configured to initiate a call to a company and navigate a phone tree on behalf of the user to reach a representative. In other cases, the intelligent voice assistant may use an API provided by the company or another access point that allows a connection to be established directly with a representative based on contextual information provided by the intelligent voice assistant. By automatically connecting a user to a representative without requiring the user to navigate a phone tree, the system and method can help save a user's time and improve customer satisfaction.

Figure 19:
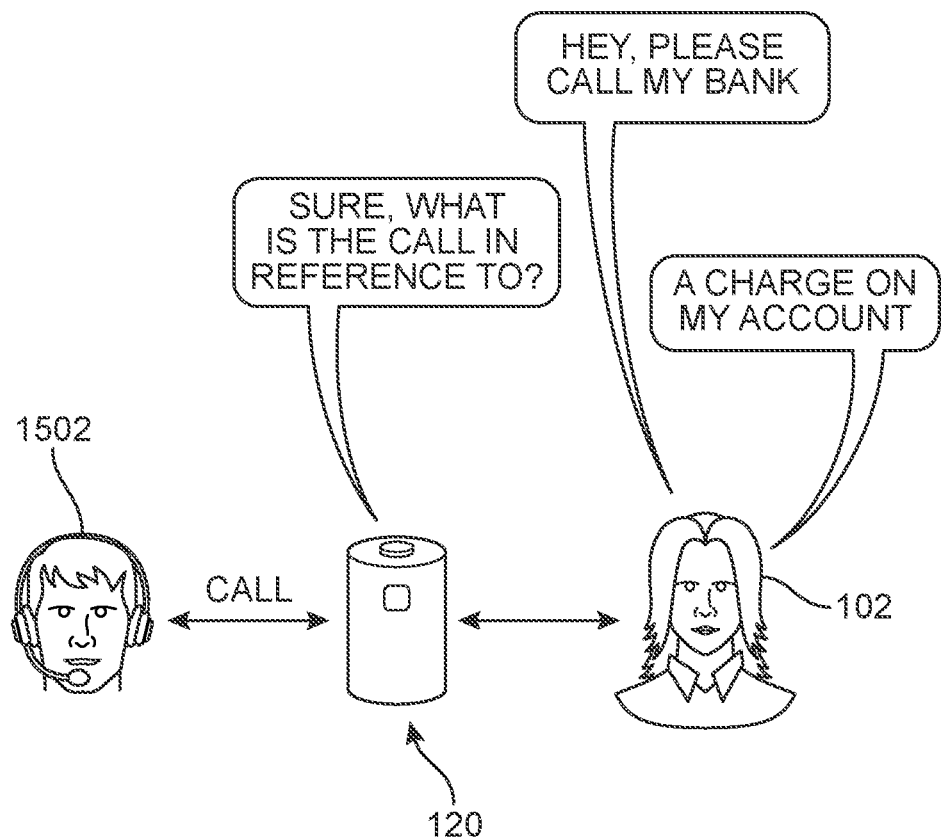
FIG. 19 is a schematic view of a situation where a user asks an intelligent voice assistant to call a service provider, according to an embodiment.

FIG. 19 is a schematic view of a situation where a user requests that an intelligent voice assistant call the bank to discuss charges on her account. Specifically, user 102 makes an audible request: "Hey, please call my bank." Intelligent voice assistant 120 responds: "Sure, what is the call in reference to?" User 102 then replies: "A charge on my account." Based on this information from user 102, intelligent voice assistant 120 may then initiate a call to get ahold of a representative 1502.

Figure 20:
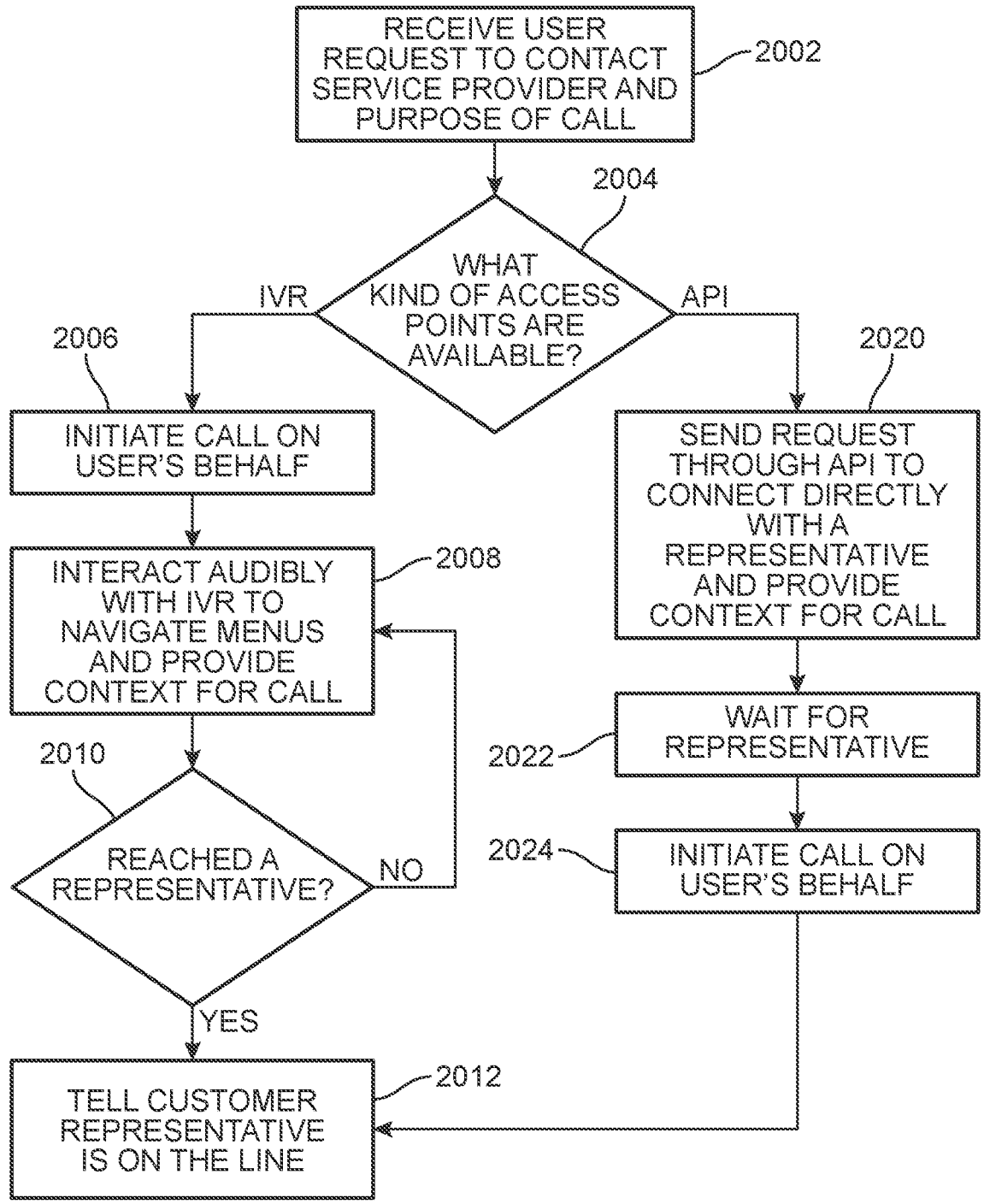
FIG. 20 is a schematic view of a process for calling a service provider on behalf of a user, according to an embodiment.

FIG. 20 is a schematic view of a process that an intelligent voice assistant may use to initiate a call and connect a user with a representative. In step 2002, intelligent voice assistant 120 may receive a user's request to contact a company along with a purpose for the call. In some cases, the user might only provide the request for the call initially and intelligent voice assistant 120 could follow up and ask what the call is about. Knowing what the call is about may help intelligent voice assistant 120 navigate to the right representative and/or ensure the user's issue is addressed early on in the call.

In step 2004, intelligent voice assistant 120 may determine what kind of access points are available for connecting with a representative. If intelligent voice assistant 120 determines that the customer services system uses an interactive voice response (IVR) system, then intelligent voice assistant 120 may proceed to step 2006.

Figure 21:
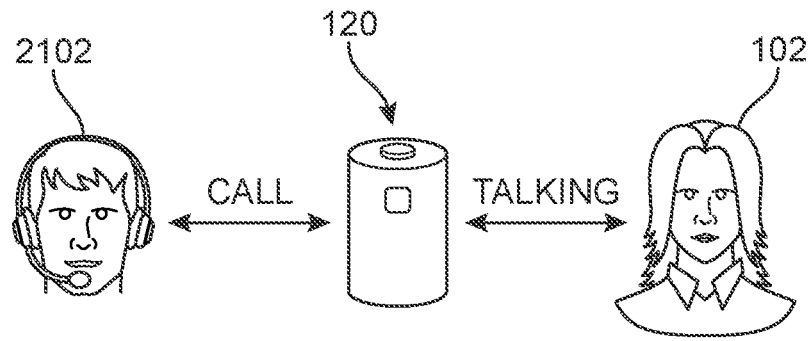
FIG. 21 is a schematic view of a first calling configuration where an intelligent voice assistant initiates a call with a representative over the internet, according to an embodiment.
Figure 22:
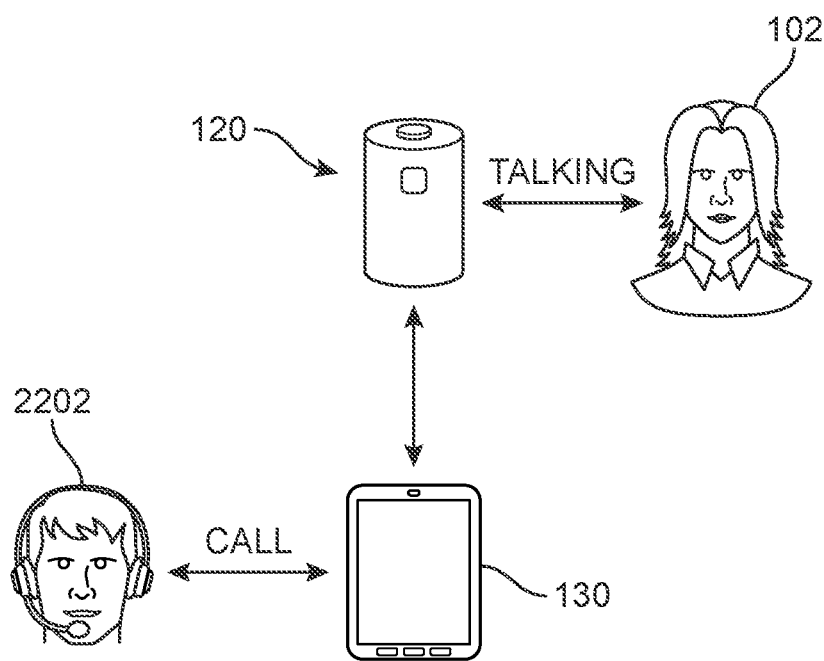
FIG. 22 is a schematic view of a second calling configuration where an intelligent voice assistant initiates a call with a representative through a user's smart phone, according to an embodiment.

In step 2006, intelligent voice assistant 120 may initiate a call on the user's behalf. In some cases, calls can be placed directly through computing device 121 of intelligent voice assistant 120. Such a configuration is illustrated in FIG. 21. Using a VoIP protocol, a call may be placed by intelligent voice assistant 120 to a customer services system including a representative 2102. Alternatively, intelligent voice assistant 120 could control user device 130 through a personal area network as in FIG. 22. Specifically, intelligent voice assistant could initiate a call to representative 2202 through user device 130 over a cellphone network. Moreover, in some cases, intelligent voice assistant 120 could operate as a speakerphone so that user 102 doesn't have to listen/talk through user device 130.

Returning to the process of FIG. 20, after a call has been initiated at step 2006, intelligent voice assistant 120 may proceed to step 2008. In step 2008, intelligent voice assistant 120 may interact audibly with the IVR system to navigate customer menus and provide context for the call. During this step it is possible that intelligent voice assistant 120 may turn off its speaker so that the user is not forced to listen to the process of navigating a phone tree.

In order to navigate an interactive voice response menu, or similar kind of automated menu, an intelligent voice assistant may use any context provided by a user and/or any information that can be retrieved from various systems (for example, from a database associated with the service provider where user information is stored).

If intelligent voice assistant 120 reaches a representative in step 2010, it may proceed to step 2012. Otherwise, intelligent voice assistant 120 may return to step 2008. In step 2012 intelligent voice assistant 120 audibly informs the user that a representative is on the line. At this point intelligent voice assistant 120 may become inactive and allow the user to converse with the representative. In some cases, however, intelligent voice assistant 120 could begin monitoring the call and providing enhanced assistance, as discussed in further below with respect to FIGS. 28-29.

If, during step 2004, intelligent voice assistant 120 determines that there is an API available for communicating with a customer services system without having to navigate a phone tree, intelligent voice assistant 120 may proceed to step 2020. In step 2020, intelligent voice assistant 120 may send a request through an API to be connected directly with a representative. The request may include information about the user and context for the call so that the user can be matched with the proper representative. After this, in step 2022, intelligent voice assistant 120 may wait for a representative. Once an available representative is found, a call may be initiated in step 2024 and intelligent voice assistant can proceed to tell the user the representative is on the line in step 2012.

Another common frustration that users may have is trying to reconnect with the same representative after a call has been dropped. The exemplary system described above may be used to mitigate this problem by configuring an intelligent voice assistant with the ability to automatically reconnect a user with a particular representative after a dropped call. Alternatively, if the intelligent voice assistant is unable to reach the same representative, the intelligent voice assistant may be capable of providing a summary of the earlier call to a new representative to that the user doesn't have to explain the earlier call to the representative. By facilitating reconnection with the same representative after a dropped call, the system and method can save the user time by reducing the need to have the user explain the previous conversation with another representative, thereby improving overall user satisfaction.

Figure 23:
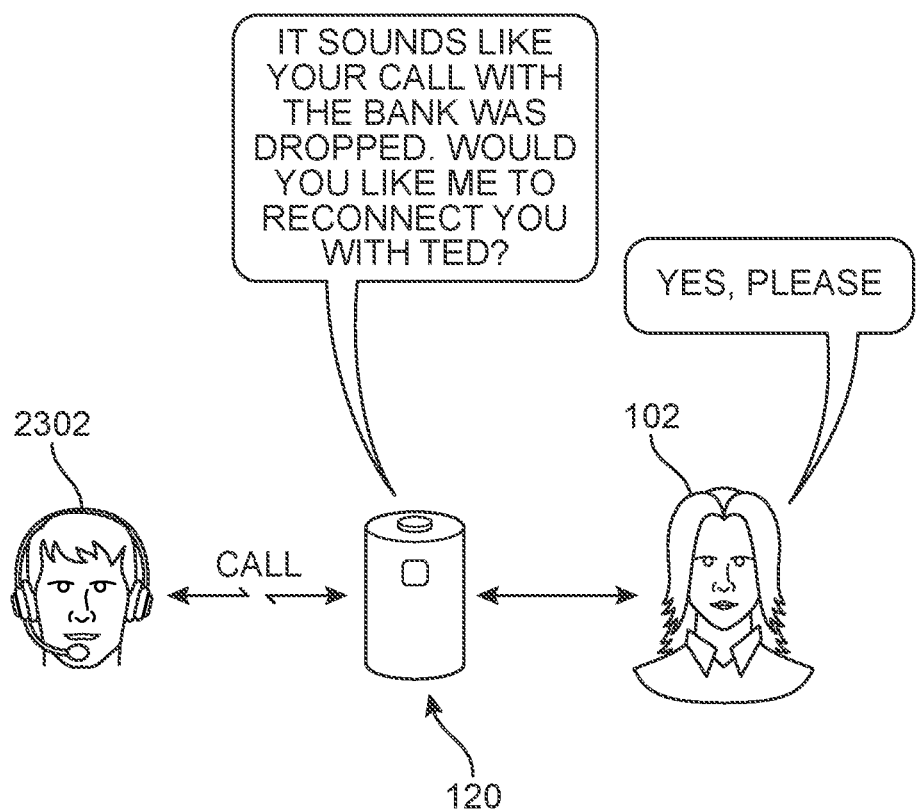
FIG. 23 is a schematic view of a situation where an intelligent voice assistant prompts a user to reconnect with a representative after a dropped call, according to an embodiment.

In FIG. 23, a user has just experienced a dropped call with a representative. After detecting the dropped call, intelligent voice assistant 120 offers to automatically re-connect user 102 with representative 2302. Specifically, intelligent voice assistant 120 explains "It sounds like your call with the bank was dropped," and then asks "Would you like me to reconnect you with Ted?". Here Ted may be the name of representative 2302.

Figure 24:
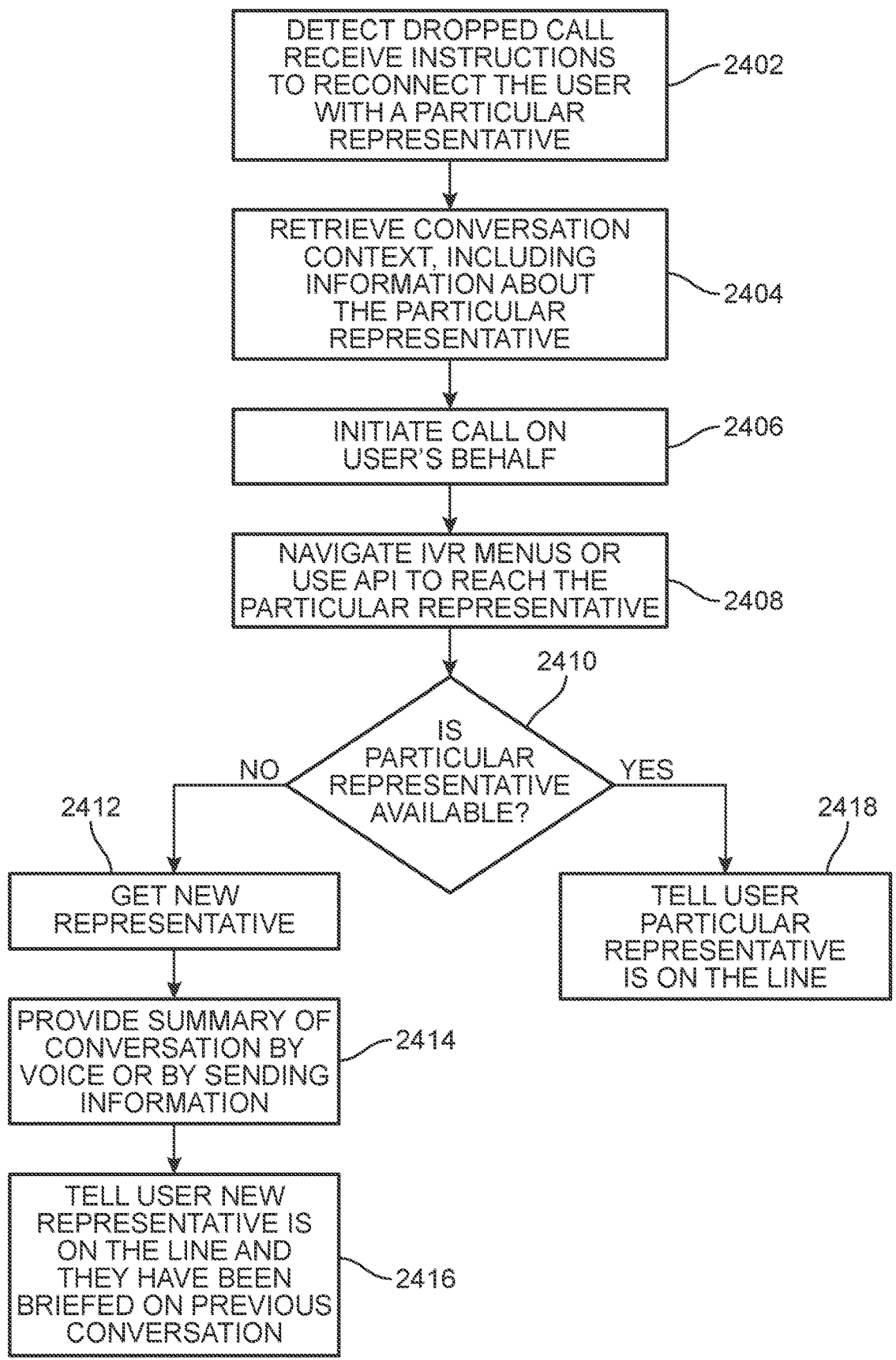
FIG. 24 is a schematic view of a process for reconnecting a user with a representative after a dropped call, according to an embodiment.

FIG. 24 is a schematic view of a process for helping a user after a dropped call. First, in step 2402, intelligent voice assistant 120 may detect a dropped call. In some cases, however, the process could begin with a user simply instructing intelligent voice assistant 120 to reconnect them with a particular representative. This latter situation could occur even when a call was not "dropped" and the disconnection was intentional. For example, a user may hang up with a representative and then realize they forgot to ask a particular question. Instead of initiating a new call with another representative who won't have the context of the earlier call, a user could simply ask intelligent voice assistant 120 to reconnect them with the last representative they spoke with.

Next, in step 2404, intelligent voice assistant 120 may retrieve any available information that provides context for the call. This information could include information about the representative that the user recently spoke with, including any identifying information to help intelligent voice assistant 120 reconnect with that specific individual. Identifying information for a representative could include, but is not limited to: the representative's name, an employee number or other ID number, a department associated with the representative, or any other identifying information. Identifying information can be retrieved from a log or summary of the previous call that is maintained by intelligent voice assistant 120, which is described in further detail below. In some cases, intelligent voice assistant 120 could send a request to computer system 112 of the representative's company to retrieve call log information that could include the name or other identifying information about the representative that the user recently spoke with. In some other cases, intelligent voice assistant 120 could prompt the user to provide the name or other information about the representative. For example, intelligent voice assistant 120 could ask, "Do you remember the name of the representative you just spoke with?".

After retrieving any context about the call, including identifying information for the representative, intelligent voice assistant 120 may initiate a call on the user's behalf in step 2406. Next, in step 2408, intelligent voice assistant 120 may navigate an IVR menu system or use an API to reach the particular representative directly. If an API access point is available, the call may be initiated after first making API calls, in some cases, as described above and depicted in FIG. 20.

At step 2410, intelligent voice assistant 120 determines if the particular representative is available. In the case where intelligent voice assistant 120 must navigate an IVR menu system, this step may occur when intelligent voice assistant 120 first reaches a representative. If the representative is not the one intelligent voice assistant 120 is looking for, intelligent voice assistant 120 may ask to be transferred to that representative, assuming he or she is available. In the case where intelligent voice assistant 120 uses an API access point, it may be possible to determine if the representative is available prior to initiating a call.

If the particular representative is available, intelligent voice assistant 120 proceeds to step 2418 and informs the user. At this point, the user is reconnected with the representative and can continue their conversation.

If the particular representative is not available, or if intelligent voice assistant 120 is unable to identify the correct representative for some reason, intelligent voice assistant 120 proceeds to step 2412 to get a new representative on the line for the user. Next, in step 2414, intelligent voice assistant 120 provides a summary of the conversation between the user and the previous representative. To provide this summary intelligent voice assistant 120 may audibly explain key points of the conversation to the new representative. Intelligent voice assistant 120 may also send information to the representative's device. This information could include a call log, a written summary of the call, general information about the user or any other kind of information that might be relevant for the representative to know.

After providing context for the call to the new representative, intelligent voice assistant may tell the user that the new representative is on the phone and has been briefed on the previous conversation at step 2416. At this point, the user may begin talking with the new representative.

Figure 25:
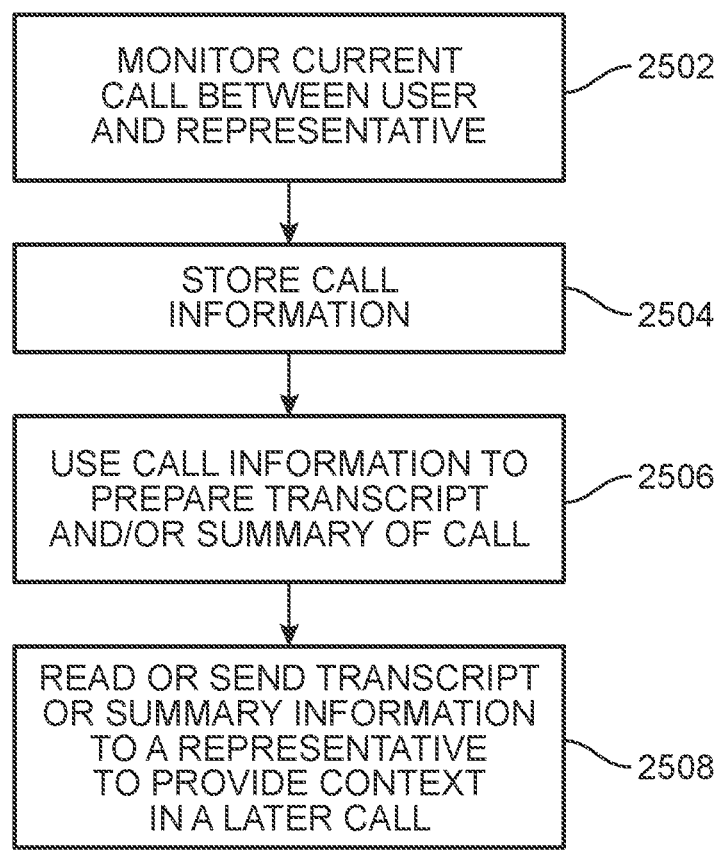
FIG. 25 is a schematic view of a process for monitoring and storing call information for a call between a user and a service representative, according to an embodiment.

FIG. 25 is a schematic view of a process for providing context to a representative after a lost call. A similar process could also be used for any other situation where a user wants to continue a previous conversation or otherwise give a representative particular context prior to talking with the representative. In a first step 2502, intelligent voice assistant 120 may monitor the current call between a user and a representative. Next, in step 2504, intelligent voice assistant 120 may store any data resulting from monitoring the call (for example, call log data). Methods for monitoring calls, processing the information, and storing any related data are described in further detail below with respect to FIGS. 26-27.

In step 2506, intelligent voice assistant 120 may use the data stored in step 2504 to prepare a transcript and/or a summary of the call. In step 2508, intelligent voice assistant 120 may read or send any transcripts or summary information to a new representative to provide context in a later call.

Figure 26:
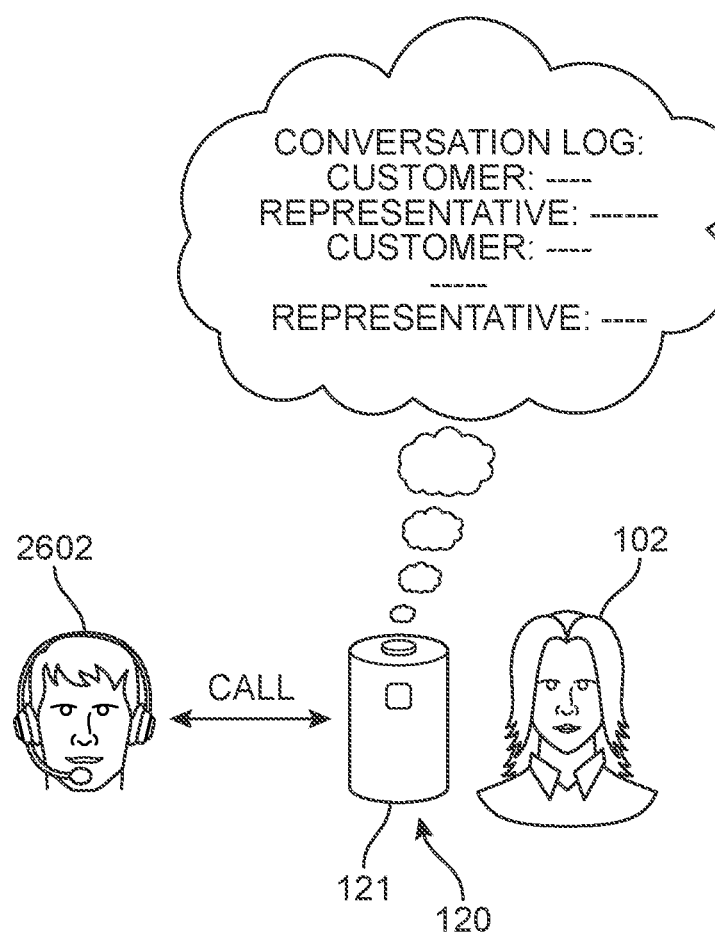
FIG. 26 is a schematic view of situation where an intelligent voice assistant logs call information between a user and a service representative, according to an embodiment.

FIG. 26 is a schematic view of a configuration in which an intelligent voice assistant 120 may monitor a call between user 102 and a representative 2602. During the call, which may be facilitated by computing device 121, intelligent voice assistant 120 may record and store a transcript of the call and/or other call log information (such as time of call, duration, etc.). This transcript and/or other call log information could be stored locally or uploaded to a remote server for storage. In some cases, transcripts and other log information could be further processed into call summaries, which may not provide the entire dialogue of a conversation but extracted content in the form of key points. For example, rather than storing an entire conversation, an intelligent voice assistant could summarize a call with simple key points like "purpose of call: customer is unhappy with an account fee." Such a summary may provide important context if the customer calls back to speak with another representative.

Figure 27:
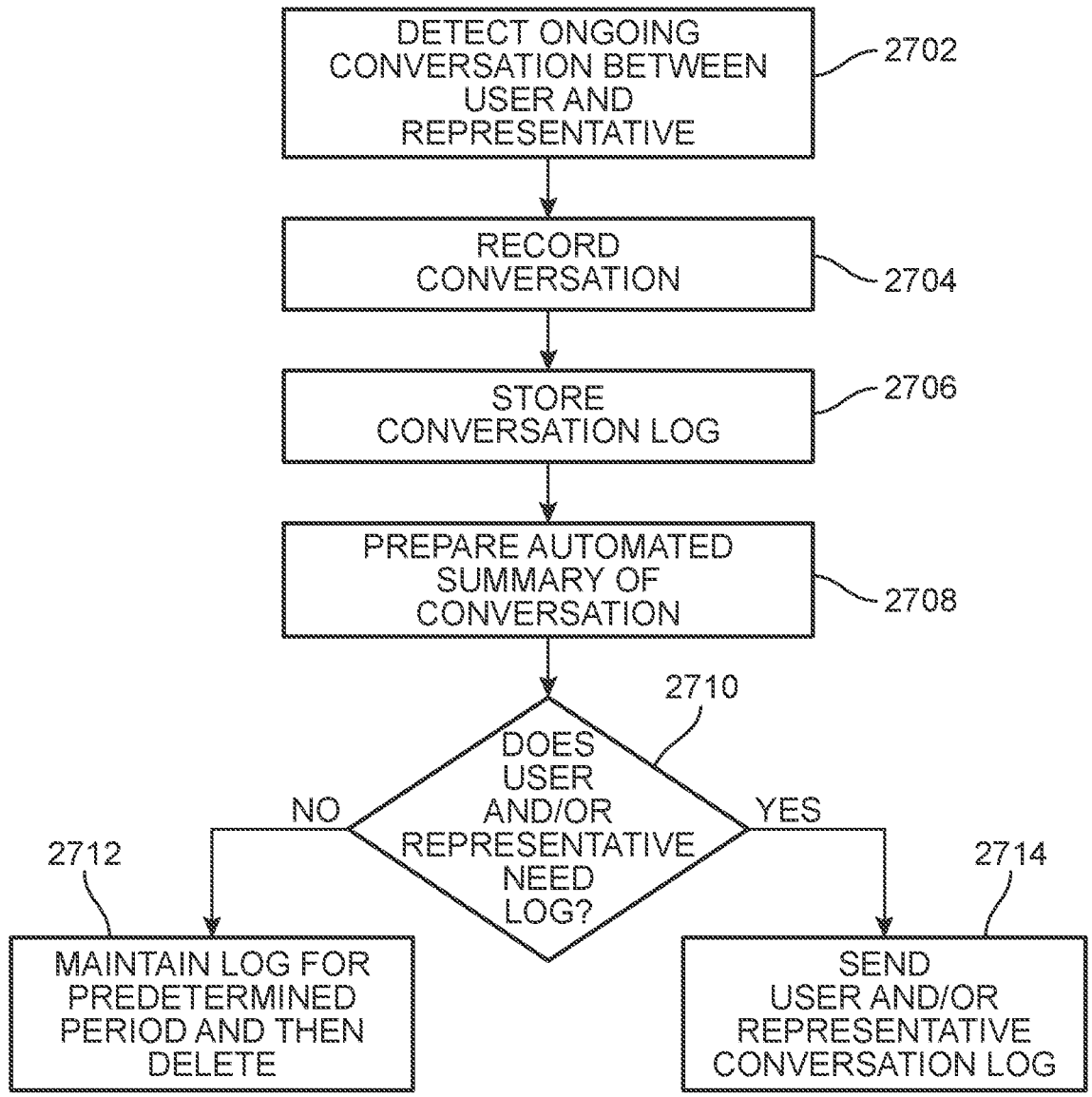
FIG. 27 is a schematic view of a process for storing call information and sending the information to a user and/or representative, according to an embodiment.

FIG. 27 is a schematic view of a process for recording and using conversation log information. As used herein, the term "conversation log" refers to any information about a conversation between a user and a representative, including transcripts, meta-data (conversation time, duration, representative name, etc.), summary information and any other relevant information.

In a first step 2702, intelligent voice assistant 120 may detect an ongoing conversation between a customer and a representative. In step 2704, intelligent voice assistant 120 may record the conversation. The conversation may be recorded as an audio file. In some cases, however, intelligent voice assistant 120 could process the audio file into a text-based file, since a text-based transcript may generally have a smaller file size than a corresponding audio file of the conversation. At step 2706, intelligent voice assistant 120 may store the conversation log. The conversation log can comprise any text-based or audio files related to the conversation, as well as data including call time, call duration, representative name, and any other related information.

In step 2708, intelligent voice assistant 120 could prepare an automated summary of the conversation based on the conversation log. Next, in step 2710, intelligent voice assistant 120 determines if the user or the representative needs to see the conversation log. If not, intelligent voice assistant 120 proceeds to step 2712 where it may maintain the log for a predetermined period and then delete it. Deleting older files may save space, which may be useful when full length audio files of conversations are being stored. If the user or representative need a copy of the conversation log, intelligent voice assistant 120 may send the conversation log to one or both parties at step 2714.

Representatives attempting to assist users with tasks such as signing e-documents may lack awareness of the user's technological capabilities. For example, a representative may not be aware that a user's phone supports e-signing using the phone's fingerprint sensor. The exemplary system described above may help mitigate this problem by configuring an intelligent voice assistant with the ability to detect instances where it can suggest actions based on awareness of the user's connected devices and/or other contextual information that the representative may lack. By providing support during a call, the system and method can increase the range of options available to a user for accomplishing the user's goals.

Figure 28:
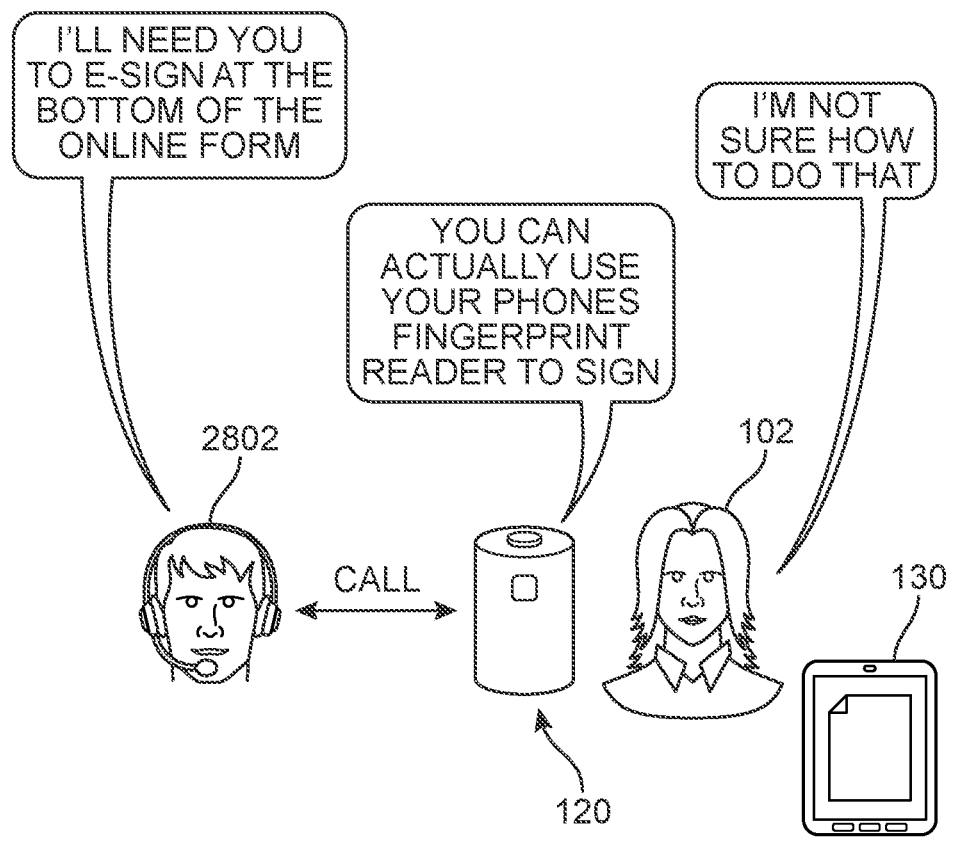
FIG. 28 is a schematic view of a situation where an intelligent voice assistant offers guidance for signing an electronic document.

An example of such a situation is depicted schematically in FIG. 28. Here, representative 2802 informs user 102 that the user needs to provide an e-signature at the bottom of a particular form (which may be displayed for a user on user device 130). The user, who is unfamiliar with e-signatures, responds "I'm not sure how to do that." Following this, intelligent voice assistant 120 interjects that "You can actually use your phone's fingerprint reader to sign." In some cases, intelligent voice assistant 120 could provide further questions and instructions, such as, "do you already have your fingerprint reader enabled? If so, simply press your finger against the home button where the fingerprint reader is located."

Figure 29:
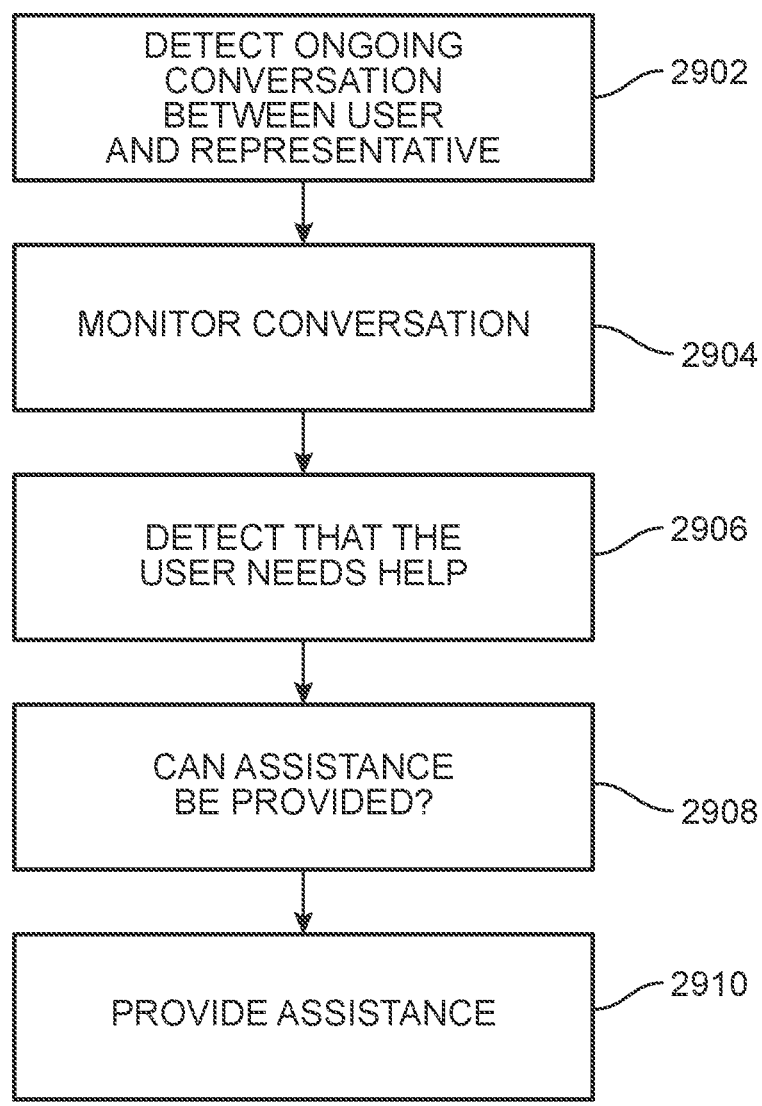
FIG. 29 is a schematic view of a process for detecting that a user needs help and providing assistance, according to an embodiment.

FIG. 29 is a schematic view of a process for providing enhanced assistance during a call between a representative and a user. In step 2902, intelligent voice assistant 120 detects an ongoing conversation between a user and a representative and proceeds to monitor the conversation in step 2904.

During step 2906, intelligent voice assistant 120 detects that the user needs help. To determine that a user needs help or assistance, intelligent voice assistant 120 may listen for known words or phrases that are associated with predefined tasks. One example of a predefined tasks includes instructing users on methods for signing electronic documents. As another example, a predefined task may include displaying a particular view in an application or on a website for a user based on content they are trying to find. As another example, a predefined task could include opening an application on a user's device, such as a browser, an application associated with the service provider, or another suitable application.

In step 2908, intelligent voice assistant 120 checks its available functionality to see if assistance can be provided for the user's need. If so, in step 2910, intelligent voice assistant 120 proceeds to provide assistance to the user.

Many users may find that conversations with a service representative can be difficult due to the limited types of interactions that can be mediated over the phone. For example, over the phone it may be difficult for representatives to detect a user's mood, environmental stresses or other cues that might help them determine how to best help a user with a given problem. The exemplary system described above may be used to mitigate this problem by configuring an intelligent voice assistant with the ability to detect user sentiment and/or sense environment stressors.

Figure 30:
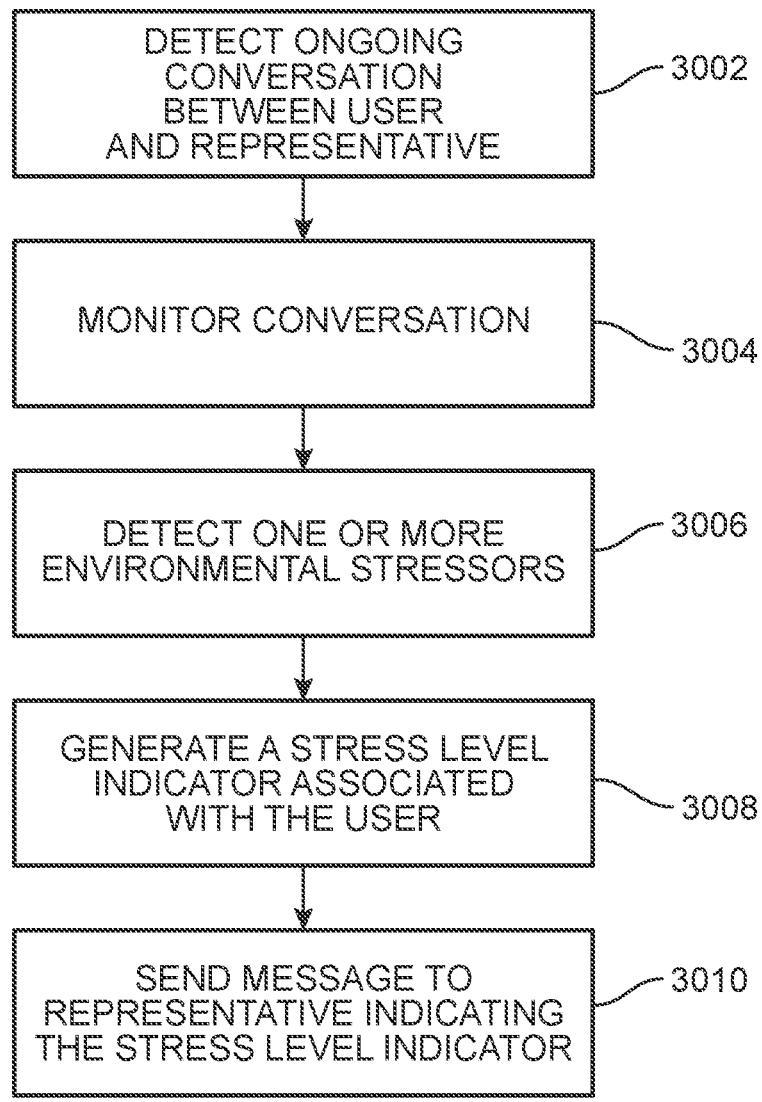
FIG. 30 is a schematic view of process for determining a user's stress level based on environmental sounds, according to an embodiment.

FIG. 30 is a schematic view of a process for detecting environmental stressors in an environment. In step 3002, intelligent voice assistant 120 may detect an ongoing conversation between a user and a representative. Next, in step 3004, intelligent voice assistant 120 may monitor the conversation and the user's environment. Monitoring the environment may include listening for sounds that can provide information about the level of stressors present in the user's environment. For example, if intelligent voice assistant 120 detects a crying baby in the user's environment, intelligent voice assistant 120 can use this information to make a judgment about the user's potential stress level.

At some point in the conversation intelligent voice assistant 120 may detect one or more environmental stressors in the user's environment during step 3006. Specifically, intelligent voice assistant 120 may detect sounds that are processed and interpreted as being associated with stressors, such the sounds of a crying baby. Next, in step 3008, intelligent voice assistant 120 may generate a stress level indicator associated with the user. The stress level indicator could be a rating (for example, a level from 0 to 3 with 0 being the least stressed and 3 being the most stressed), or it could be a qualitative label: "stressed", "a little stressed," or "not stressed." In some cases, a cause of the stress could also be determined.

In step 3010, intelligent voice assistant 120 may send a message to the representative with the stress level indicator and/or any other stressor information. For example, intelligent voice assistant 120 could send a message "user is a little stressed." If the cause of stress is known, intelligent voice assistant 120 can indicate that as well. For example, intelligent voice assistant 120 may include that "there is a crying baby in the room with the user" in its message to the representative.

An intelligent voice assistant can send messages to a representative as text or as spoken messages. If intelligent voice assistant uses speech to communicate information such as the user's stress level, the intelligent voice assistant may turn off the speaker (for example, speakers 204) so that user is not provided with this information.

It may be appreciated that the presence of one or more far-field microphones 206 (see FIG. 2) as part of intelligent voice assistant 120, may allow for increased sensitivity in detecting environmental noises compared to microphones that may be present in conventional phones (i.e., cordless phones or cell phones).

An intelligent voice assistant could be configured to detect user sentiment. As used herein, the term "user sentiment" refers to the user's mood or affect. User sentiment can be determined by sentiment analysis, which attempts to classify a segment of text or spoken words by their polarity (that is, positive or negative) and or by a wider range of emotional categories such as "angry", "sad", and "happy". The embodiments may use any known methods for performing sentiment analysis on text and/or spoken language. These can include, but are not limited to, tools from natural language processing, text analysis, computational linguistics and biometrics.

Figure 31:
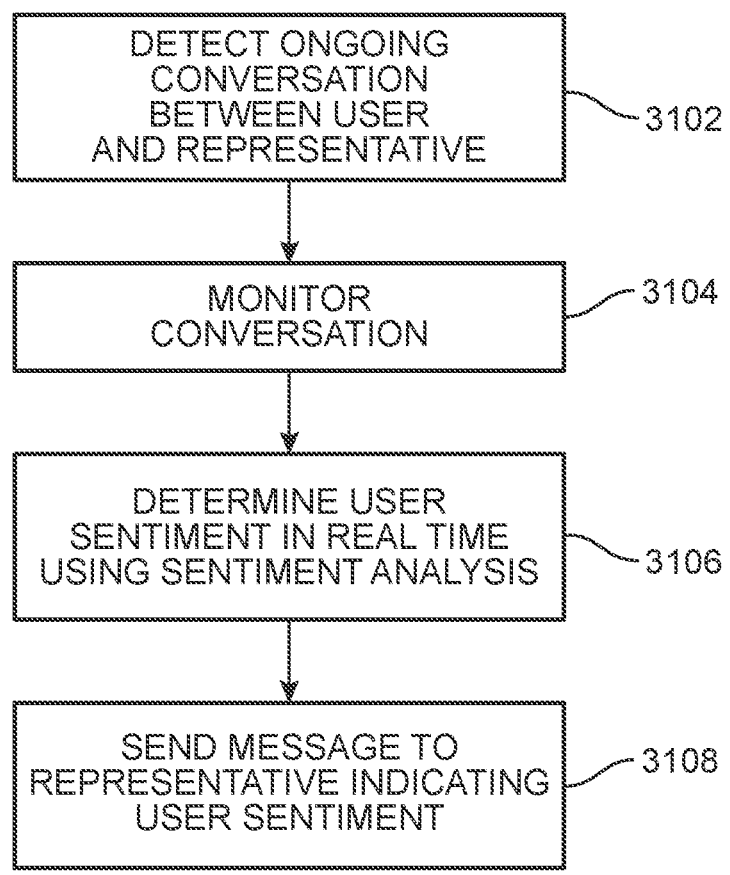
FIG. 31 is a schematic view of a process of determining a user's sentiment, according to an embodiment.

FIG. 31 is a schematic view of a process for detecting user sentiment from their word choice and/or from the tone of their speech. In step 3102 and step 3104, intelligent voice assistant 120 may detect an ongoing conversation and monitor the conversation as described in the process of FIG. 30. In step 3106, intelligent voice assistant 120 may determine user sentiment in real time using sentiment analysis. In step 3108, intelligent voice assistant 120 may send a message to the representative including the user sentiment.

An intelligent voice assistant may also provide assistance with gathering information related to various kinds of services. In particular, if an intelligent voice assistant is connected with one or more local systems or devices that are capable of providing diagnostic information for a particular system, this information can be retrieved by the intelligent voice assistant and delivered to a representative. As an example, if a user has an auto insurance policy with an insurance company, a representative of the company may ask for information from any diagnostic sensors that are connected with an intelligent voice assistant. A representative could ask the intelligent voice assistant to request diagnostic results from one or more sensors in the user's vehicle. If the results of the diagnostic tests indicate any problems, the user may be informed that their insurance rates will be raised until the issue has been resolved, since any problems with the vehicle's performance may pose a higher insurance risk to the company. In a similar manner, if a user has a homeowner's insurance policy, a representative could request diagnostics from any fire detectors that may be connected to the intelligent voice assistant. By providing assistance with diagnostic tests, the system and method may help mitigate risks for a service provider, as well help users stay on top of maintenance for safety systems like smoke detectors and various car sensors (for example, tire pressure sensors, oxygen sensors, and other kinds of sensors).

Figure 32:
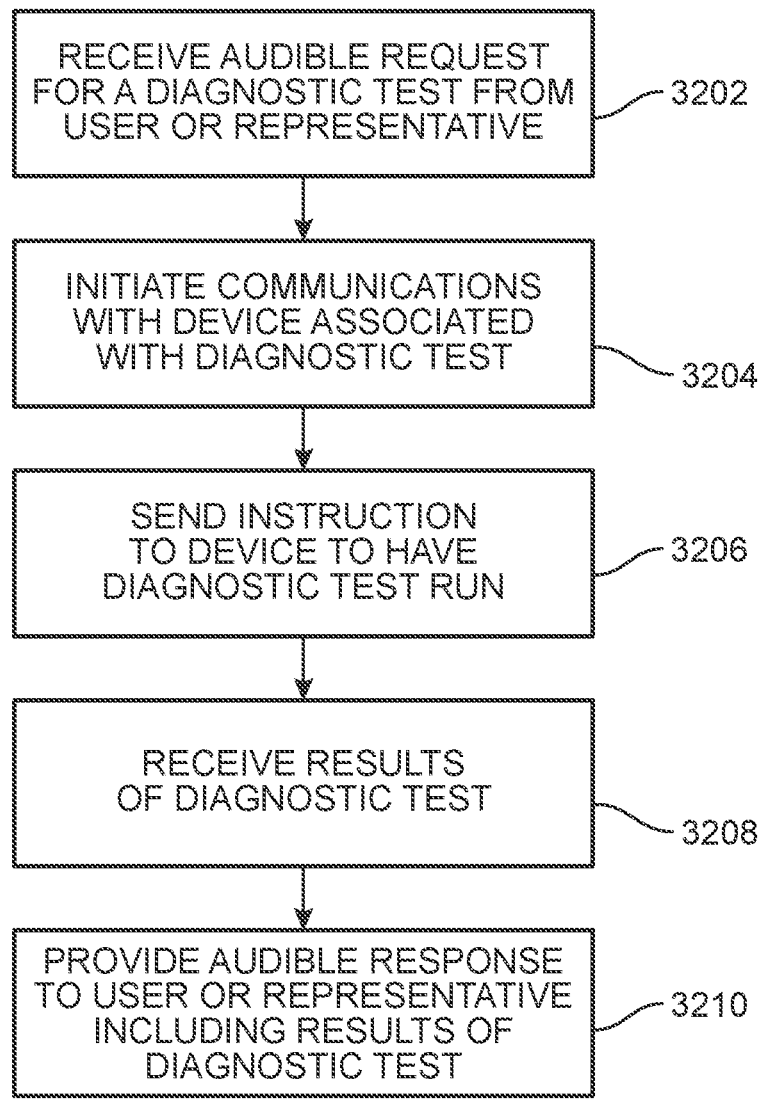
FIG. 32 is a schematic view of a process of requesting a diagnostic test on a connected device and providing the results of the test.

FIG. 32 is a schematic view of a process for retrieving diagnostic test results for a representative. In a first step 3202, intelligent voice assistant 120 may receive an audible request for a diagnostic test from the user or representative. In step 3204, intelligent voice assistant 120 may initiate communicates with the device associated with the diagnostic test. For example, if the diagnostic test is a fire detector test, intelligent voice assistant 120 may initiate communication with any fire detectors that may be connected to a network, such as the internet or a local area network.

In step 3206, intelligent voice assistant 120 may send instructions to the device to have a diagnostic test run. In some cases, the instructions can be provided using an API exposed by the device that allows for external requests for diagnostic tests. In step 3208, intelligent voice assistant 120 may receive the results of the diagnostic test. Finally, in step 3210, intelligent voice assistant 120 may provide an audible response to the user and/or representative including the results of the diagnostics test.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Although the processes for explaining documents to a user, pushing content to a user device, calling a service provider on behalf of a user and providing enhanced support through monitoring and analysis of a user-representative conversation may be performed separately, it may be appreciated that in some cases an intelligent voice assistant may perform two or more of these processes in combination to assist a user and/or representative. As one example, an intelligent voice assistant could provide an explanation of a document to a user. If the user has questions that the intelligent voice assistant is unable to answer, the intelligent voice assistant could automatically call the service provider to put the user in contact with a service representative. During the call with the representative the intelligent voice assistant could push content to the user and/or representative and could also provide other kinds of enhanced support, such as instructing a user on how to sign an electronic document. Thus it may be appreciated that each of these different capabilities compliment one another and help provide a consistent user experience that may reduce user frustration and increase overall satisfaction when compared to more conventional customer service approaches that require users to wade through phone trees to have even the most basic questions about documents answered.

Many, or all, of the processes described above and shown in the figures can be performed by one or more software modules running on the computing device of an intelligent voice assistant (and/or running on a server as part of the remote assistant services). Therefore, many, or all, of the above processes may be characterized as steps performed by one or more specific software modules of an intelligent voice assistant. For example, the process of FIG. 6 can be performed by the document explanation module 212 shown in FIG. 2. To receive spoken instructions, interpret those instructions and provide a spoken response, document explanation module 212 may communicate with speakers 204, microphones 206 and voice module 210, for example, using application program interfaces provided by these hardware components and/or software modules. The processes of FIGS. 8-10 may also be performed by document explanation module 212 in a similar manner. Additionally, the process of FIGS. 16 and 18 can be performed by push content module 214 (see FIG. 2) by interfacing with one or more of the hardware or software modules of computing device 121. Additionally, the processes of FIGS. 20, 24, 25 and 27 can be performed by call connection module 216 (see FIG. 2) by interfacing with one or more of the hardware or software modules of computing device 121. Additionally, the processes of FIGS. 29-32 can be performed by enhanced assistance module 218 (see FIG. 2) by interfacing with one or more of the hardware or software modules of computing device 121.

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of helping a user to pay a bill, the method being performed by an intelligent voice assistant, comprising the steps of:
   receiving, by the intelligent voice assistant, a request from the user about a document;
   retrieving, by the intelligent voice assistant, information about the document;
   determining, by the intelligent voice assistant, that the document is a bill based on the retrieved information about the document;
   providing an audible response to the user from the intelligent voice assistant, the response informing the user that the document is a bill;
   receiving, by the intelligent voice assistant, an instruction from the user to pay the bill; and
   initiating a bill payment action by the intelligent voice assistant.

2. The method according to claim 1, wherein the bill payment action includes authorizing an online payment for the user.

3. The method according to claim 1, wherein the bill payment action includes providing instructions for paying the bill online.

4. The method according to claim 1, wherein the bill payment action includes initiating a call to a phone based bill payment system.

5. The method according to claim 1, further comprising:
   preauthorizing the intelligent voice assistant to make at least one bill payment; and
   wherein the bill payment action includes automatically initiating the at least one bill payment that has been preauthorized in response to receiving the instruction from the user.

6. The method according to claim 1, wherein the bill payment action includes controlling, by the intelligent voice assistant, a screen of the user to automatically navigate to a website or application.

7. The method according to claim 1, wherein the request from the user is an audible request.

8. The method according to claim 1, wherein the instruction from the user is an audible instruction.

9. The method according to claim 1, wherein retrieving information about the document includes accessing records associated with the user to determine which documents have been sent to the user.

10. The method according to claim 1, wherein retrieving information about the document includes retrieving document summary information.

11. A method of assisting a user to pay a bill, the user having access to a user device running a software application, and wherein the assistance is performed by an intelligent voice assistant separate from the user device, the method comprising:
    receiving, by the intelligent voice assistant, a request from the user about paying a bill;
    identifying, by the intelligent voice assistant, a target view associated with the software application on a display of the user device that includes a bill payment form for paying the bill; and
    sending, by the intelligent voice assistant, a request to the software application to display the target view on the user device.

12. The method according to claim 11, further comprising:
    receiving, by the intelligent voice assistant, a request for assistance in filling out the bill payment form.

13. The method according to claim 11, wherein sending the request to the software application includes making a call to an application program interface (API) of the software application.

14. The method according to claim 11, wherein the software application is a browser and wherein the target view is a portion of a webpage.

15. A system for assisting a user pay a bill, the system comprising:
    a user device associated with the user;
    an intelligent voice assistant comprising a microphone, a speaker, and at least one processor configured to implement instructions for assisting a user pay a bill;
    a communication network connected to the user device and the intelligent voice assistant, the user device and the intelligent voice assistant communicating over the communication network; and
    wherein the at least one processor of the intelligent voice assistant is configured to:
      receive a request from the user about a document;
      retrieve information about the document;
      determine that the document is a bill based on the retrieved information about the document;
      provide an audible response to the user, the response informing the user that the document is a bill;
      receive an instruction from the user to pay the bill; and
      initiate a bill payment action.

16. The system according to claim 15, wherein the bill payment action includes authorizing an online payment for the user.

17. The system according to claim 15, wherein the bill payment action includes providing instructions for paying the bill online.

18. The system according to claim 15, wherein the bill payment action includes initiating a call to a phone based bill payment system.

19. The system according to claim 15, wherein the at least one processor of the intelligent voice assistant is further configured to:
- receive a preauthorization to make at least one bill payment; and
- wherein the bill payment action includes automatically initiating the at least one bill payment that has been preauthorized in response to receiving the instruction from the user.

20. The system according to claim 15, wherein the bill payment action includes controlling, by the intelligent voice assistant, a screen of the user to automatically navigate to a website or application.

\* \* \* \* \*